(12) United States Patent
Maltz

(10) Patent No.: US 10,528,130 B2
(45) Date of Patent: *Jan. 7, 2020

(54) UNITIZED EYE-TRACKING WIRELESS EYEGLASSES SYSTEM

(71) Applicant: Telepatheye Inc., Castro Valley, CA (US)

(72) Inventor: Gregory A. Maltz, Castro Valley, CA (US)

(*) Notice: Subject to any disclaimer, the term of this patent is extended or adjusted under 35 U.S.C. 154(b) by 36 days.

This patent is subject to a terminal disclaimer.

(21) Appl. No.: 15/977,834

(22) Filed: May 11, 2018

(65) Prior Publication Data

US 2018/0260024 A1  Sep. 13, 2018

Related U.S. Application Data

(63) Continuation-in-part of application No. 14/798,349, filed on Jul. 13, 2015, now Pat. No. 9,977,496, which is a continuation-in-part of application No. 14/716,510, filed on May 19, 2015, now Pat. No. 9,916,006, which is a continuation-in-part of application No. 14/066,654, filed on Oct. 29, 2013, now Pat. No. 9,557,812, which is a continuation-in-part of application No. 13/117,146, filed on May 27, 2011, now Pat. No. 8,593,375, which is a continuation-in-part of application No.
(Continued)

(51) Int. Cl.
*G06F 3/01* (2006.01)
*G02B 27/01* (2006.01)

(52) U.S. Cl.
CPC ........... *G06F 3/013* (2013.01); *G02B 27/017* (2013.01); *G02B 2027/0138* (2013.01); *G02B 2027/0178* (2013.01); *G02B 2027/0187* (2013.01)

(58) Field of Classification Search
CPC .................. G06F 3/013; G02B 27/017; G02B 2027/0187; G02B 2027/0178; G02B 2027/0138
See application file for complete search history.

(56) References Cited

U.S. PATENT DOCUMENTS 5,943,171 A * 8/1999 Budd ................. G02B 27/0172
359/631
6,299,308 B1 * 10/2001 Voronka ............... G02B 27/017
351/210
(Continued)

*Primary Examiner* — Mihir K Rayan
(74) *Attorney, Agent, or Firm* — Stephen E. Zweig

(57) ABSTRACT

A user-worn eye-tracking device, method, and system. The eye-tracking device may have an outward appearance resembling standard eyeglasses or sunglasses, and may also comprise a built-in wireless transceiver and an optional optical display. In addition to eye-tracking, the device can allow the user to inconspicuously transmit data by a process in which the user simply moves his or her eyes and/or optionally gazes at various internal or external display targets. The device's eye tracking system and software track the motion and gaze of the user's eyes, and convert this gaze into eye-position data and/or message symbols and system control commands. The device then transmits any of the resulting eye position data, commands or messages using its transceiver. In a preferred embodiment, the device is self-contained and operates, when placed on the user's head, without the need of external battery packs or external transceivers.

20 Claims, 15 Drawing Sheets

Related U.S. Application Data

13/034,182, filed on Feb. 24, 2011, now Pat. No. 8,531,394, which is a continuation-in-part of application No. 12/842,315, filed on Jul. 23, 2010, now Pat. No. 8,531,355.

(56) References Cited

U.S. PATENT DOCUMENTS

| | | | |
|---|---|---|---|
| 8,531,355 B2* | 9/2013 | Maltz | G06F 3/013 345/8 |
| 8,531,394 B2* | 9/2013 | Maltz | G02B 7/287 345/156 |
| 9,665,172 B2 | 5/2017 | Engwall et al. | |
| 9,727,991 B2 | 8/2017 | Guenter et al. | |
| 9,977,496 B2* | 5/2018 | Maltz | G06F 3/013 |
| 2003/0076300 A1* | 4/2003 | Lauper | G06F 3/013 345/158 |
| 2005/0206583 A1 | 9/2005 | Lemelson et al. | |
| 2010/0149073 A1* | 6/2010 | Chaum | G02B 27/0093 345/8 |
| 2014/0247277 A1* | 9/2014 | Guenter | G06T 11/40 345/611 |

* cited by examiner

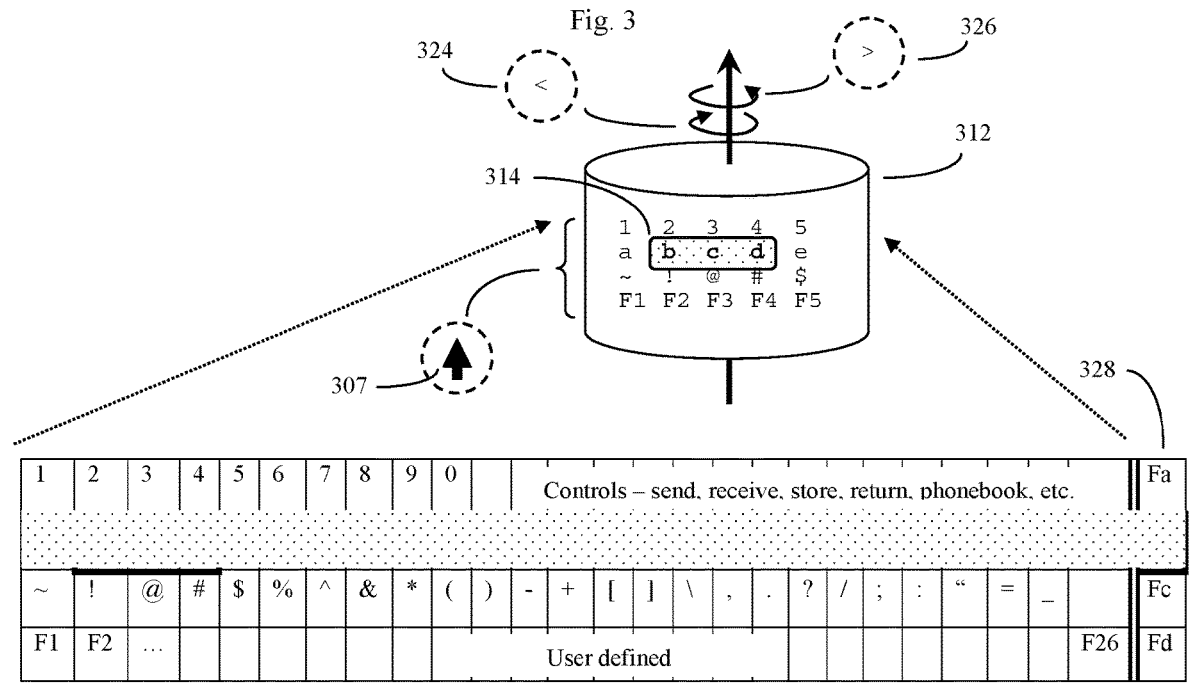
Fig. 3
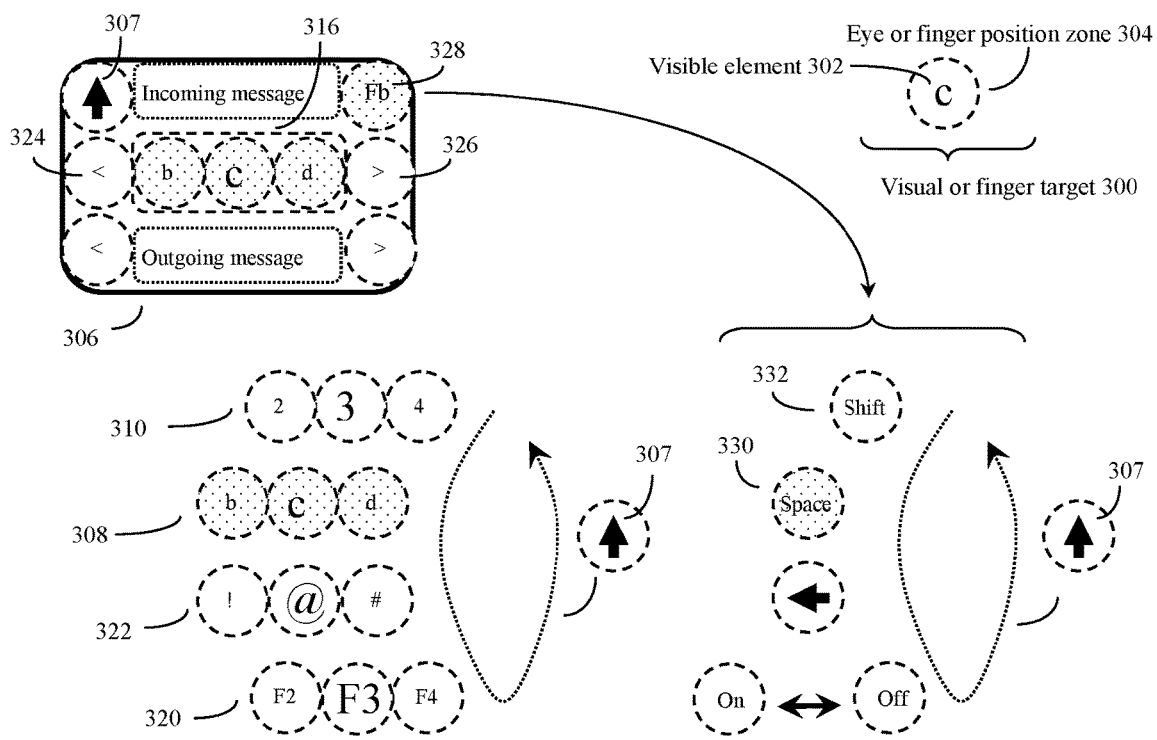
Main symbols vary by row and column     Fa-Fd keys only shift according to row

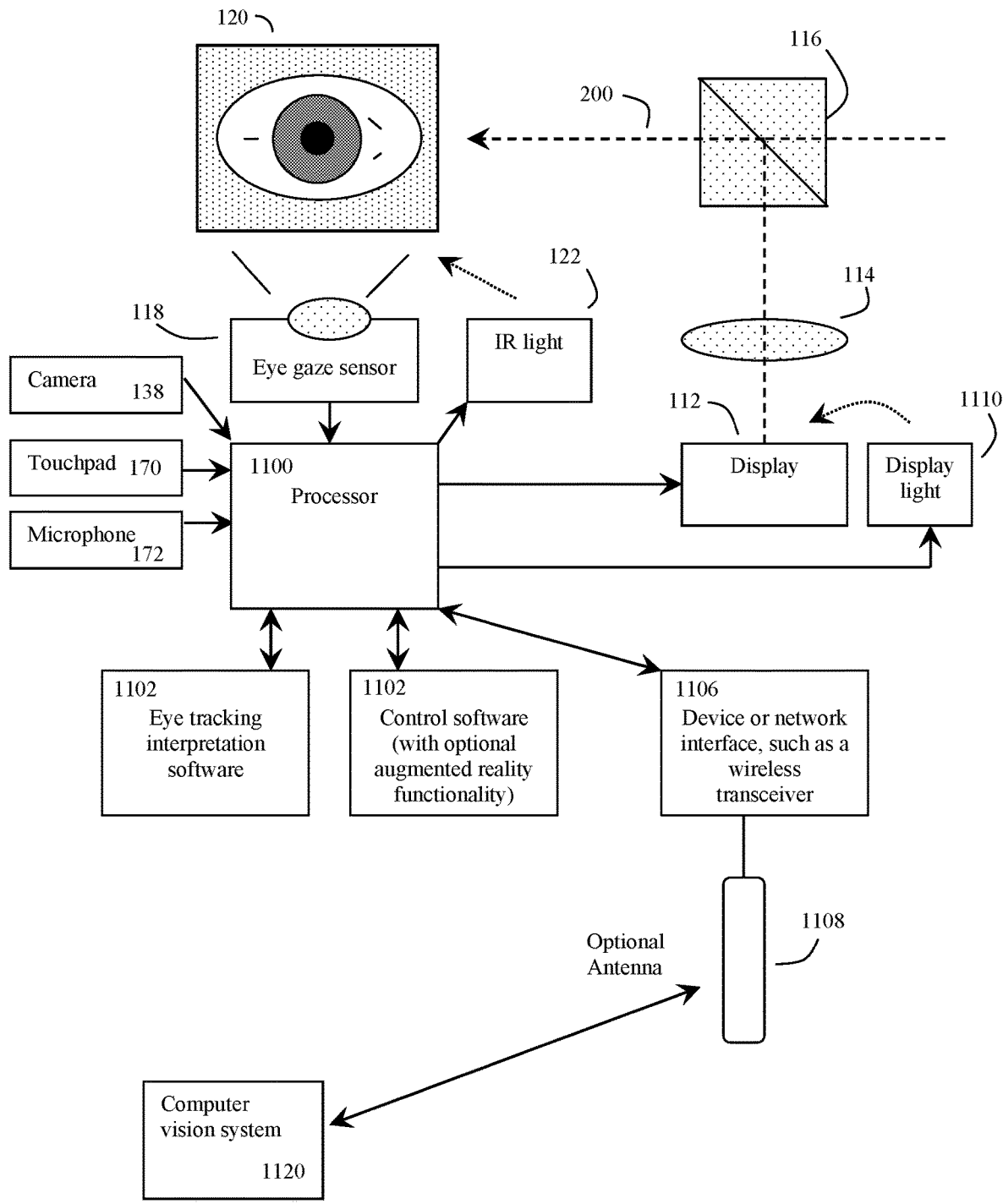

UNITIZED EYE-TRACKING WIRELESS EYEGLASSES SYSTEM

This application is a continuation in part of U.S. patent application Ser. No. 14/798,349; application Ser. No. 14,789,348 was a continuation in part of U.S. patent application Ser. No. 14/716,510, "EYEWEAR DEVICE USER INTERFACE AND METHOD", filed May 19, 2015; application Ser. No. 14/716,510 in turn is a continuation in part of U.S. patent application Ser. No. 14/066,654, "EYE GAZE USER INTERFACE AND CALIBRATION METHOD", filed Oct. 29, 2013; Ser. No. 14/066,654 was a continuation in part of U.S. patent application Ser. No. 13/117,146, "EYE GAZE USER INTERFACE AND METHOD" filed May 27, 2011, now U.S. Pat. No. 8,593,375; Ser. No. 13/117,146, in turn, was a continuation in part of U.S. patent application Ser. No. 13/034,182 filed Feb. 24, 2011, now U.S. Pat. No. 8,531,394; Ser. No. 13/117,146 was also a continuation in part of U.S. patent application Ser. No. 12/842,315, "Unitized, Vision-Controlled, Wireless Eyeglass Transceiver", filed Jul. 23, 2010; now U.S. Pat. No. 8,531,355; the contents of all of these applications are incorporated herein by reference in their entirety.

BACKGROUND OF THE INVENTION

Field of the Invention

The invention is in the field of eye gaze controlled user interfaces for head-mounted displays, particularly as applied to the control of wireless computing and device control by tracking the user's eye position.

Description of the Related Art

As cellular telephones and other mobile devices have proliferated, so has the field of augmented reality, wherein the devices may offer additional data or visual information to individuals depending on their location and personal data. In both enterprise and in consumer device operation, an individual should ideally also find this augmented data actionable to perform a work-related or personal computing command. If this functionality is not addressed by the user interface, the augmented data becomes less useful, and social friction and/or lost business opportunities can result. For example, an augmented image that the device user cannot then quickly and easily select for an additional computing, such as sharing with contacts, is less useful than one that also affords additional actionable options.

However, the act of using a cell phone or other handheld mobile device to perform a computing command in response to any real, virtual, or augmented data can be obtrusive, conspicuous and in some situations inappropriate. Thus there are many times when it is inadvisable or socially awkward to operate applications or respond to incoming data or images. Thus at present, a mobile user is faced with the difficult problem of trying to balance priority between the environment e.g., the person, data or object they are addressing in the physical world, versus the person, data or object that is presented virtually or augmented by the mobile device. Indeed, there are many situations where the user may also wish to inconspicuously eye control various types of devices, as well to issue commands based on real, virtual and augmented data.

Lemelson, in U.S. patent publication No. 2005/0206583, published Sep. 22, 2005, taught a heads-up display system that used an infrared (IR) laser that is projected through a lens and reflected by a mirror onto the user's eyes. Reflections from the user's eye are reflected back onto a mirror and then through a lens onto an IR photodetector or IR camera. The system projects a visible cursor, and the user moves the cursor by focusing both of his eyes on specific icons.

Engwall, in U.S. patent publication No. 2015/0061996, filed Mar. 5, 2015 (based on provisional patent 61/873,154, filed Sep. 3, 2013, now U.S. Pat. No. 9,665,172 issued May 30, 2017), taught various eye-tracking methods.

Foveated image rendering methods are taught by Guenter, U.S. Pat. No. 9,727,991, and other workers.

BRIEF SUMMARY OF THE INVENTION

The invention was inspired, in part, by the insight that prior art eye tracking systems, such as Lemelson, employed IR lasers, mirrors, folded (e.g. non-linear optical pathways), eye focusing, and a moveable cursor (e.g., a traditional cursor, such as those associated at the time with desktop systems that used an input device controlled by the user's hands, such as a mouse, to move the cursor). In order to optimize the invention for an eyewear device, an improved eye tracking system was needed that operated without displaying or employing traditional cursor methods.

In some embodiments, the method may be a method and system of eye tracking. This method can comprise wearing a compact self-contained head-mounted eye-tracking device comprising a head-mountable frame. This frame will have at least one user eye-tracking sensor or camera that is positioned to track the movement of one or both eyes of the user, and that can operate without the use of mirrors or other complex optical pathways. This eye tracking may be enabled by a sensor or camera and by emitting IR or near IR (NIR) light toward the eye. The device will also have at least one processor, and at least one wireless transceiver positioned either in the frame or alternatively in close proximity to the frame. The method can operate by using this at least one processor to execute eye tracking executable code and control executable code. This code can direct the eye-tracking device to transmit wireless information by using an eye-tracking sensor or camera to track the user's eye motion. The processor and code can translate the motion of the user's eye into eye position data or alternatively at least one symbol or command, and then use the wireless transceiver to transmit this eye position data or at least one symbol or command.

This wireless information may be the coordinates (e.g., x,y,z) or tracking data of the user's eye gaze, and/or it may be more highly processed information, such as one or more symbols that have been selected by the direction of the user's eye gaze, or in some embodiments executable code that launches other functions.

An additional improvement over prior art devices, such as the eye tracking devices of Lemelson, is that the present invention can operate without the need of a visible cursor, and indeed without any built-in display at all. As will be discussed, the invention discloses user interfaces that operate so that at least some of the motion and eye gaze direction of the user's eye (or eyes) can be done without tracking the position of a moveable cursor. Thus, the transmitted wireless information can be transmitted without requiring the use of a moveable cursor.

In one embodiment, the invention may be a software controlled user interface and method for an eyewear device. In some embodiments, the eyewear device will often comprise a visual display as well. Indeed, in some embodiments, the eyewear device will often comprise additional user input sensors, such as touchpads or other fingertip detection sensors, cameras to view or capture images of the outside world, and the like.

The method is simple, intuitive, and when used in conjunction with a visual display can scale between displaying a small to a large number of different target symbols at any given time, yet still transmit a large array of different symbols to outside devices with minimal user training. In some embodiments, at least part of the method may be implemented by way of a virtual window onto the surface of a virtual cylinder, with sensitive symbols that can be rotated either by changes in eye gaze direction, e.g., pupil position, or alternatively by fingertip swiping to bring various groups of symbols into view, and then selected. Specific examples of the use of this interface and method on an eyeglasses-like head-mountable, device are disclosed, along with various operation examples including sending and receiving text messages and control of the head-mountable device, as well as other external devices. In the context of real, virtual or augmented data being presented to the user, the invention may allow the user to interact with the data in many ways.

The method will generally use either at least one eye position sensor or touch sensor (such as a touchpad—i.e. a touch-tracking touchpad sensor or other type of touch sensor, which may be built into the device or alternatively tethered physically or wirelessly to the device) to determine how the user is interacting with a plurality of visible elements displayed by an optional eyewear device screen or another type of display. In some embodiments, a virtual touchpad projected by the eyewear device may also be used instead of a hardware touchpad. The method will keep track of either the user's eye gaze direction, or the user's finger movement, and make visual changes in the display. Alternatively, the invention may signal the user by other sensory means such as mild vibration, sound, or other alternative method.

In some embodiments, the user operates the interface by either letting the user's eye gaze or finger position continue to remain within an eye (or finger) position zone for a particular visible element for a time period exceeding a certain period of time (usually on the order of around 0.25 seconds), or alternatively (for touch sensor control) scrolling and selecting as well as activating or tapping a virtual cursor or keys. The user and system can then use this "virtual key press" or activation to control various functions such as transmitting or receiving information, retrieving or storing information in memory, general system control, and controlling other outside devices as well. The system can be automated in conjunction with virtual reality and augmented reality data disclosed in other patent applications, such as Lamb et. al., U.S. patent publication 20140002492 A1, "Propagation of real world properties into augmented reality images", the contents of which are incorporated herein by reference. Here Lamb et al define and teach various differences between real, virtual and augmented content. The method disclosed in the present application teaches an actionable method to select computer commands, unique to that content, which can also operate over real, virtual, and augmented content.

In some embodiments, the methods disclosed herein may use an interface based on the concept of a virtual rotating wheel, cylinder, or other virtual surface. This virtual surface can be a virtual solid that has various visible elements, again often symbols such as letters, numbers, and punctuation marks, around the surface or circumference of this virtual sold.

In a typical embodiment, only some of these visible elements will generally be presented or displayed at any one time to the user via an optional virtual display. However, by either gazing or using fingertip commands to rotate the virtual solid, or to move to different rows of symbols on the surface of this virtual solid, the sequence of displayed visible elements can be scrolled through in a predictable manner. When touch control is desired, touches on the touchpad can be registered as a keystroke by the system, and thus used for various functions as described above. Likewise, swiping the finger up, down, or side to side can rotate the virtual solid to rapidly scroll through the virtual keys, symbols, or data to access the desired content.

In some embodiments, as will be described, such techniques may be very useful for various augmented reality applications as well.

BRIEF DESCRIPTION OF THE DRAWINGS

FIG. 3 shows a more detailed overview of the invention's user interface and method.

FIG. 11 shows one example of the electrical circuitry and software that may be used to implement the present invention's eye gaze or touchpad user interface and method

DETAILED DESCRIPTION OF THE INVENTION

Figure 1A:
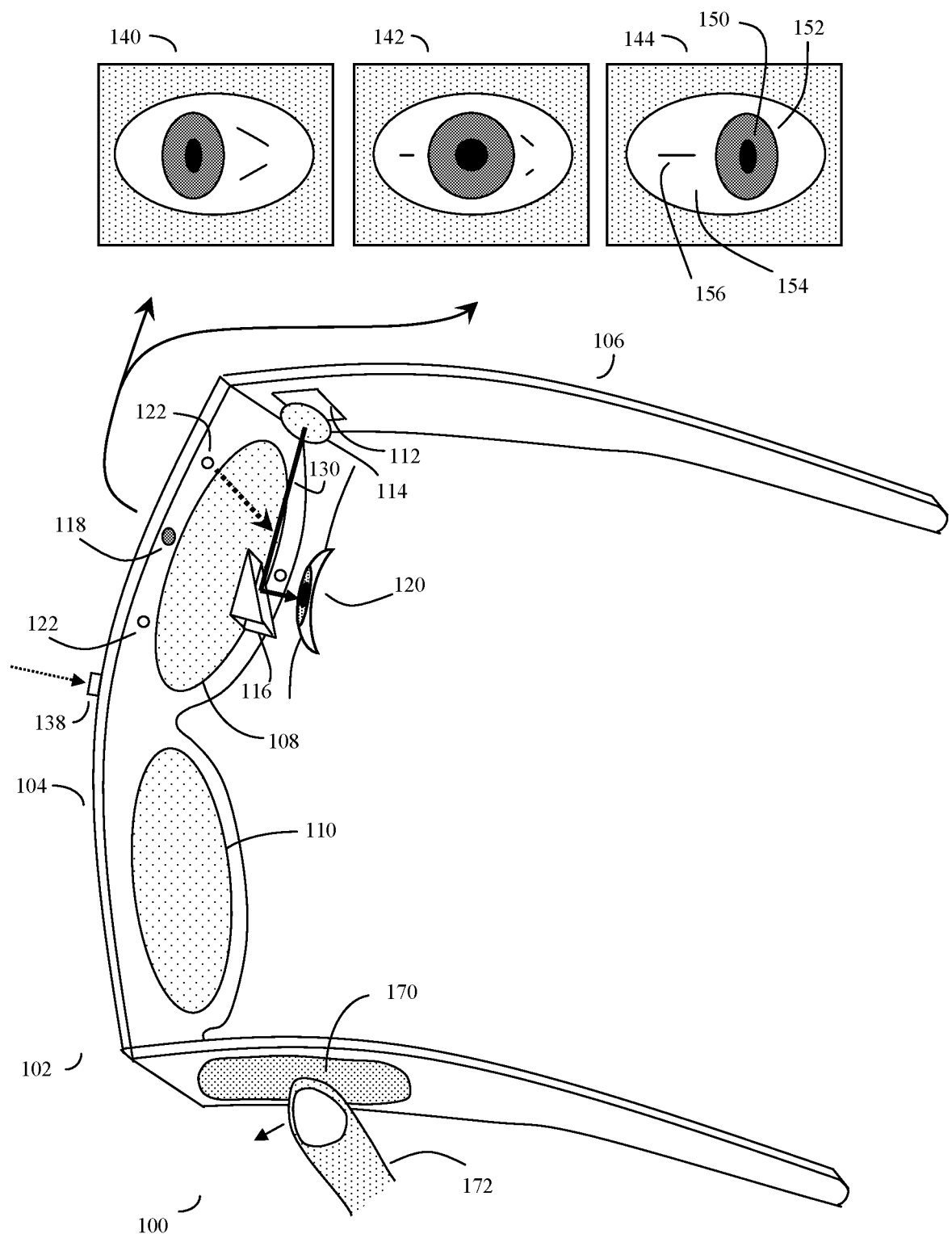
FIG. 1A shows an example of one type of device where either the invention's eye gaze tracking system may be implemented.

In previous parent patent applications, exemplified by parent patent application Ser. Nos. 14/798,349, 14/789,348, 14/716,510, 14/066,654, 13/117,146, 13/034,182, and 12/842,315, the contents of which are incorporated herein by reference, methods of controlling various eye wearable devices were proposed. The device now disclosed is essentially an eye tracking system, consisting of an eye tracking sensor or camera optimally positioned to detect the position of the user's eye, an illumination source that emits IR or NIR light towards the user's eye, and the eyewear assembly optimized to capture eye position with precision when using the executable code to help accommodate the user's saccades, rapid eye movements, extraneous eye data, and individual eye flaws and features. To generalize, one challenge of implementing the eye-tracking device is to solve a complex problem of operating a simple to use but flexible user interface. In addition to the previously discussed telecommunications options, many other eyewear devices have been proposed that provide virtual or augmented data or images that automatically present to the user based on GPS, altimeter, accelerometer, outward-pointed camera, or other sensors onboard the device.

Here the problems in making any direct, virtual or augmented data or images actionable to the user should be appreciated. In order to provide optimal functionality, any actionable direct, virtual or augmented content that may be automatically transmitted to an optional display on the user's device must also provide the user with choices to interact with or share the content, or execute other commands. In a preferred embodiment, these choices should be presented to the user as visible targets.

However, to avoid bombarding the user with too many visible targets, which will tend to crowd the vision and render the interface less usable, the interface should ideally minimize the number of visible targets. At the same time, the interface should also allow the user to intuitively access various targets that are not in view as well. Thus in order to accommodate all applications and use cases of the device, while making the interface simple and effective, the selectable targets may be mapped to a virtual solid that can be rotated or otherwise manipulated by eye gaze or fingertip touch to activate the desired command or access the desired content.

This "rotating solid" user interface paradigm described above is in contrast to presently implemented desktop or handheld device interfaces, which typically push a relatively large amount of targets and content into the display, and also often require the user to use a menu system, such as a scroll-down menu system as well. The "rotating solid" interface is also in contrast to presently implemented augmented reality and virtual reality applications, which generally force content to the user's device, often without making options to make the content user actionable.

According to the "rotating solid" interface methods disclosed herein, most or even all direct, virtual or augmented content pushed to the user should also provide a corresponding suite of selectable user input targets specific to that virtual or augmented content.

In a situation where each eye gaze or touch sensor target more or less approximates a symbol keystroke, this means that for high-speed operation, the user interface should be designed to account for these tradeoffs between the number of different eye position or fingertip targets, and the average time required to reliably detect eye gaze or finger touch movement or selection of these targets. As a result, in contrast to a normal computer keyboard which may have 50 to 100 different finger positions or keys, the user interface for an eyewear device will generally have a significantly smaller number of targets.

In general, generating a particular keystroke is a two-step process, in which various targets are first "selected" by a user, and then a previously "selected" target is then "activated".

Although it is not overly difficult to control the device and transmit a limited amount of information using only a few eye gaze positions or fingertip movements, the problem of sending more information (e.g. useful data such as text messages and other complex information) is more complex because a wide variety of different symbols must be transmitted. The same sort of complexity issue arises when a user may wish to use an eyewear device to perform other sophisticated functions. For example a paralyzed or handicapped individual may wish to use a touchpad to control the operation of a powered wheelchair, or even, for example, to use the device to control the operation of a robotic arm attached to the powered wheel chair. This can require a lot of different commands.

The present invention discusses a flexible type of device, user interface and method designed to work within these limitations, yet is capable of transmitting a more substantial amount of information. The methods described herein generally show far fewer different targets or target symbols for the eye to gaze upon (or touch to activate) than does a standard keyboard (which may have upwards of 50 to 100+ different keys or more). However the methods described herein are also designed to be both scalable—that is gracefully go from a very limited number of different targets or symbols to a larger number of targets or symbols, and at the same time allow for a greater variety of different symbols and commands to be transmitted, using only relatively few different eye gaze or fingertip directions.

Although the invention's devices, methods, and user interfaces may be implemented on a wide variety of different eyewear devices, in some embodiments, the invention's user interface may be implemented on devices that have an outward appearance resembling standard eyeglasses or sun glasses, such as the devices described in parent application Ser. No. 12/842,315. The invention's user interface described herein may also be implemented on other types of head-mounted or headphone devices, for example on devices having an eyepiece arm that provides both a display and an integrated touchpad. In some embodiments, the user interface methods described herein may also be used to control specially designed augmented reality or virtual reality Goggles—head mounted display screens where the user may not see the outside world or see a virtual or augmented version of the world. Typically the methods described herein will generally be implemented in software, designed to run under one or more microprocessors, on these various types of eyewear devices.

Here, a device and method of controlling a head-mountable device (also called an eyewear device) that is worn by a human user with at least one eye is disclosed. This eyewear device will generally (but not always) have a display such as a virtual display, and a device to receive input from the user, such as an eye position sensor and/or optionally at least one fingertip tracking sensor (e.g. touch sensor). This method will typically accept as input data some form of processor generated signal, such as augmented data or virtual data, and allow the user to further use the input device(s) and this augmented data or virtual data to issue various commands to the device (e.g. transmitting data, request to receive additional data, and so on).

In some embodiments, the method may work by displaying a plurality of visual targets on the virtual display. Generally each visual target will comprise at least a visible element (such as a visible symbol, which will often be a standard letter or number symbol) embedded within a position zone (e.g. an eye or fingertip position zone, such as an eye gaze target area or finger position target area) with an area that is generally at least equal in extent to the visible element. In other words, each visible element or symbol will generally be presented in the context of an equal or larger sized eye or fingertip position zone region, where a human eye gaze or touch within that position zone will be considered to be interacting with that particular visual element or symbol, and thus corresponding to an intent to select that particular symbol. Following selection of a particular visual element or symbol, this visual element or symbol is then "activated" by further user input. Here, for example, activation may comprise a user fingertip may press a touch pad position zone corresponding to a desired key, or alternatively, a user eye gaze may hover over a position zone corresponding to a desired key long enough to constitute user interest or intent to activate that particular key or element.

It should be understood that the invention's user interface and method can be implemented on a wide variety of different types of eye gaze or touch sensitive detection and virtual display devices, some head mounted, and some not. In some embodiments, the device may be head mounted, and in other case the device may not be head mounted. Some devices may only monitor one gaze or fingertip of the user, while other devices may monitor the movement and input of either eyes or multiple fingertips. In touch pad or finger pad embodiments, the touchpad may or may not have sensitivity with regard to the fingertip pressure applied, an ability to sense multiple fingertips at the same time (e.g. multi-touch capability, such as using multiple fingertips to control the target size using pinches or other type of gesture).

The device will generally, but not always, have a display upon which various visual targets, such as symbols, may be displayed in order to give the user something specific to see. The visible targets and executable commands of the interface may or may not visually relate to any real, augmented or virtual image viewed through the device. Although in this specification, often such displays are shown as see-through virtual displays (because these types of display enable a user to see the surroundings beyond the virtual display), in some embodiments, such as shown in FIG. 1B, the device will utilize a non-see-through type display. In some embodiments, no display will be required.

The device, if configured to monitor eye gaze directions, may monitor eye gaze directions by many methods, including video cameras trained on the eye along with automated image analysis software that interprets eye gaze direction from the visual appearance of the eye. Alternately the device may monitor eye gaze direction by bouncing light off of the surface of the eye and noting the direction of the reflected beam or beams of light, or other means.

Similarly, the device, if configured to monitor touch input, may monitor touch input by various methods. In some embodiments, a touch pad or touch sensor, such as a small 2D touch sensor, may be mounted on a frame or other portion of the device. Alternatively the touch pad or touch sensor may be mounted separately from the frame or other portion of the device, and communicate touch commands to the device using short range wireless signals such as Bluetooth signals, or other wired or wireless techniques.

In yet another embodiment, the aforementioned separate touch pad may be a virtual target projected by the device to appear in front of the user, and the device may employ a video camera to detect user hand or finger motion over the projected virtual target.

Here, for example, the device may display a virtual cylinder or other shape and the targets may be mapped to the surface of this virtual solid for the user to select by virtually touching, i.e., with gestures detected by the device's outward-pointed camera, to operate the interface.

The device will typically be a computer-operated device, often including at least one microprocessor, memory, and software to control the visual display. The device will generally take input from at least one of either an eye gaze sensor or touch (fingertip) sensor (and optionally other sensors such as microphones capable of receiving voice commands, accelerometers capable of detecting motion, pitch, yaw and movement, or outward pointing cams capable of detecting hand gestures) and convert this input into computer commands for controlling the device and operating the interface. In some embodiments, the device may also correlate the eye gaze direction or touch data with a particular visible element (often shown on the device's display) and eye or touch detection position zone associated with that particular visible element on the devices' display.

The head-mounted device may additionally contain various communications systems, such as wired or wireless network connections to communicate to and from other outside devices, cell phone networks, and networks such as the Internet. This can include various types of Bluetooth, WiFi, or Cellular network transceivers. Note that although in some embodiments, the microprocessor and communications systems may be internal to the head mounted device, in other embodiments, the head device may be more of a dumb device, and microprocessor(s) and communications devices may instead be outside of the device, and in some cases connected to the head mounted device by a cable.

Figure 1B:
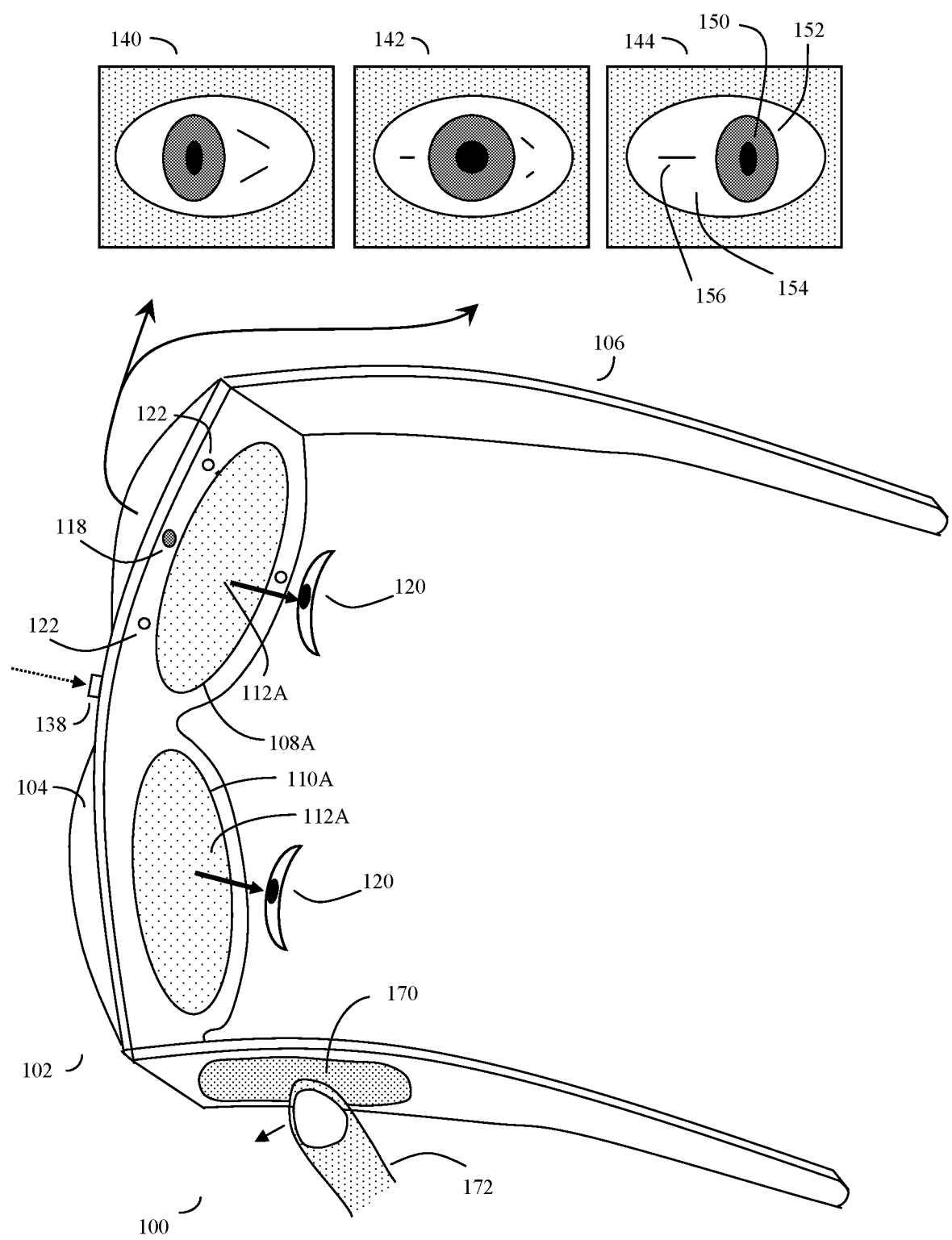
FIG. 1B shows an example of an alternative type of device where either the invention's eye gaze user interface or the invention's touch sensor/touchpad interface may be implemented.

Although the invention's user interface and method can thus be implemented on a wide variety of different eyewear/head mounted devices, for purposes of simplicity and ease of understanding, many of the specific examples and illustrations used in this specification will be based on the specific eye gaze or touch controlled device shown in FIG. 1A, which in turn is based on FIGS. 1-3 of parent application Ser. No. 12/842,315.

FIG. 1A shows an overview of one specific example of a device (100) suitable for the invention's user interface and method, here configured to resemble eyeglasses or sunglasses. In this example, the device (100) may be based on a head-mounted or mountable frame (here an eyeglass frame) (102). This head-mounted or mountable frame (102) may be divided into a frame front (104) and two frame temples (106) that extend over or behind the ears to hold the head-mounted frame in place. The frame may optionally have one or usually two lenses, such as eyeglass lenses or sunglasses lenses (108) and (110). Note that if the device is intended for immersive virtual reality applications, there may be no lenses, and instead the display screens may completely obscure the user's view of the outside world. Alternatively, the display screen may be positioned slightly above or below the horizon of the user's natural field of view.

The device will often, but not always, have an optical system that may consist of a display (112). This may be a conventional computer-driven display screen, along with various optical elements such as assistive lenses and prisms or mirrors as needed to enable the user's eye(s) to focus on the display(s). Alternatively, the display may be a virtual display that uses LED or laser to draw an image directly onto the user's retina, again assisted by optical elements as needed. These optical elements are shown in this figure as a display lens or mirror such as a converging lens or mirror (114), and a beam splitter (116) which may either be mounted on the eyeglass lens (108) or may be held separately.

The device's eye tracking sensor, which may be one or more miniaturized video camera(s) or other types of eye position sensors is shown as (118). One or more eye illumination lights, such as near-infrared (NIR) lights, may be configured to shine NIR light onto at least one of the user's eyes (120) is shown as (122).

The device's optional touch sensor, also termed a touchpad or touch sensor, if present, may be mounted on any region of the head mounted device as desired. In FIG. 1, this touch sensor (170) is shown mounted on the temple (106) of the device frame, where it can be conveniently accessed by the user's finger (172). Alternatively, the touchpad may be a remote touchpad, not attached to the frame, connecting to the head mounted device via a wire or wireless (e.g., a wireless Bluetooth™) connection to a remote touchpad.

In operation, the optional display (112) which may be located in the inner portion of the frame temple (106) near the frame front (104) may display an augmented or virtual image and a message—for example a brief text message from the user's supervisor such as "What number should I call to reach our client?". The display will show this message. Depending upon the type of display used and environmental conditions, the display may be back-lit or illuminated (not shown) to provide better contrast.

In some embodiments, the optional display may be located too close to the user's eye (120) for the eye to focus on properly. To correct for this, the display may be imaged by a mirror or lens, such as a converging lens (114), to correct the light rays (130) so that they appear to be coming from a more distant virtual object. The light rays then may pass through the beam splitter (116), and into the user's eye (120). The user will see the image of the display and the message as if the display and message were floating in the air in front of the user. At the same time, the user will also be able to see distant objects through the eyeglasses lenses as well. Although only a one eye display is shown in these examples, this optical system may be replicated on the other side of the frame as well, thus allowing both of the user's eyes to see the message. Or the display may be omitted entirely.

FIG. 1B shows an alternative embodiment of the invention. Here the display (112A) is mounted along with any lenses (108A, 110A) so that the user does not see the outside environment, but instead sees only whatever is shown on display 112A (which may provide video coverage for both of the user's eyes). This corresponds to a virtual reality headset type device. Here the lenses (108A and 110A) serve only to help the user's eyes focus on the display (112A), and the display, in turn, blocks visualization of the outside world.

This type of video headset type configuration can, for example, use a display system similar to that taught by Robinson in U.S. Pat. No. 5,696,521 (the contents of which are incorporated herein by reference). Other display systems, such as those popularized by the recent Oculus Rift Virtual Reality Headset, may also be used. In this context, the methods discussed herein may also be used for various types of virtual reality applications as well, such as movement in a virtual reality world, or operation or manipulation of various aspects (e.g. virtual objects) of the virtual reality world.

Devices Employing an Eye Tracking Sensor

Figure 1C:
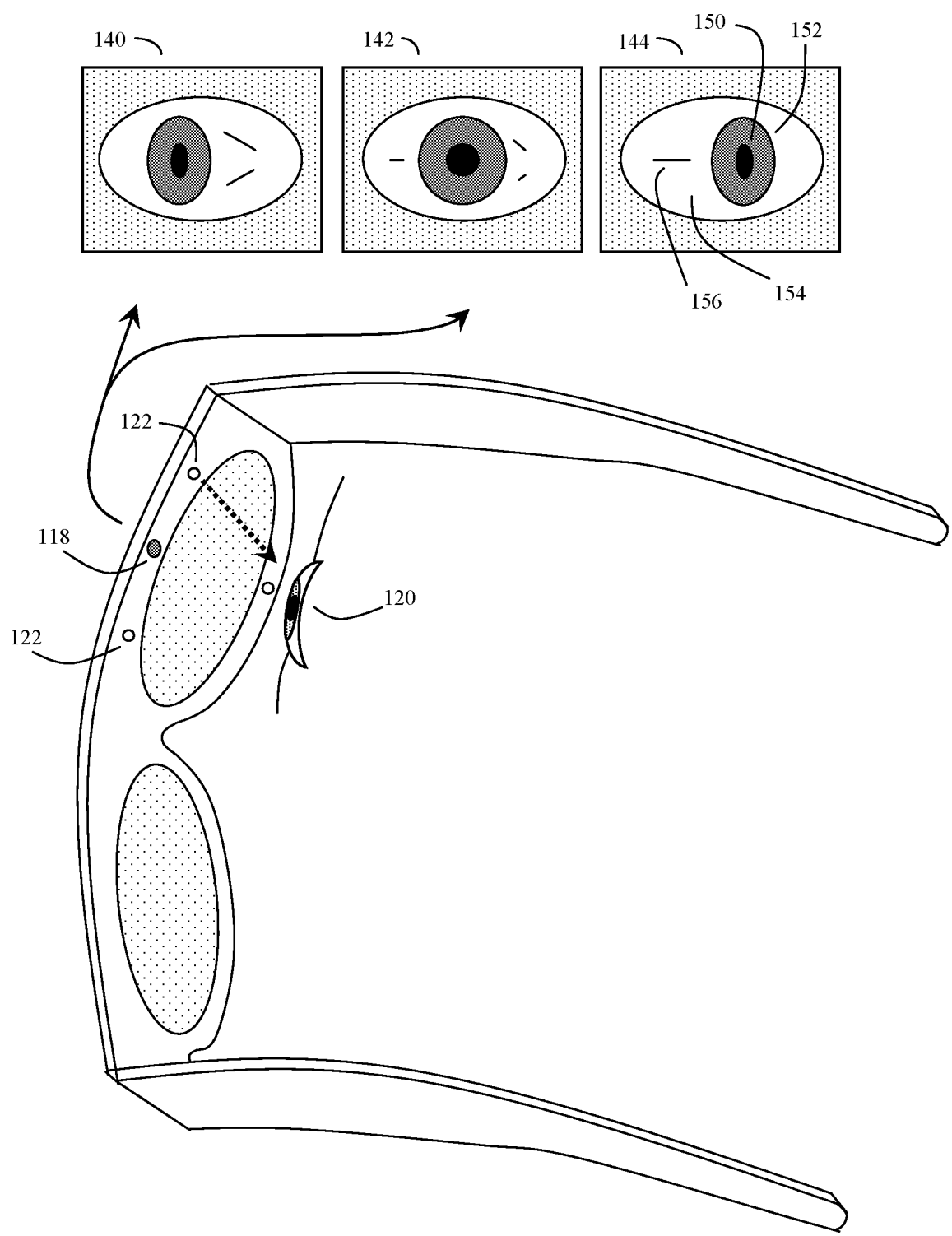
FIG. 1C, which is a modified version of FIG. 3 from parent application Ser. No. 12/842,315 filed Jul. 23, 2010, shows the invention's eye gaze components.

FIG. 1C, which is taken from original FIG. 3 of parent application Ser. No. 12/842,315, "Unitized, Vision-Controlled, Wireless Eyeglass Transceiver", filed Jul. 23, 2010, the entire contents of which are incorporated herein by reference, shows the eye gaze aspects of the device. Here, the only modification to original FIG. 3 from Ser. No. 12/842,315 is that the display portion of the device (e.g. beam splitter 116, optical display system 112, and converging lens 114) have been removed so as to just show the eye tracking system. Note that unlike Lemelson, the eye tracking system of the present system IR is more compact, illuminates the eye and observes the eye without the need of any mirrors, IR lasers, or folded optical pathways. Note also that the invention's eye tracking system can operate without visible cursors, and can operate using either one eye or both eyes as desired.

More specifically, please note that the present invention can operate without the need of a visible cursor, and indeed (in some cases) without any built-in display at all. Instead, various alternative user interfaces can be used. Some of these alternative user interfaces can operate so that at least some of the motion and eye gaze direction of the user's eye (or eyes) can be done without tracking the position of a displayed cursor. As a result, the invention can transmit useful information, such as the direction of the user's gaze, or various symbols, without requiring the use of a visible cursor.

In some embodiments, an eye tracking sensor, such as a frame mounted camera (118) can track the motion and gaze direction of the user's eye (120). For example, the user's eye (120) may be illuminated by NIR light from one or more frame mounted IR lights (122). The frame mounted video camera (118) which is focused on the user's eye (120) captures images of the eye (120) as the eye gazes in different directions, and looks at different virtual targets presented by the visual display system. Some of the images captured by video camera (118) as the eye (120) looks in different directions are shown as (140), (142) and (144). In (140) the eye is looking to the left, in (142) the eye is looking straight ahead, and in (144) the eye is looking to the right. In many embodiments, the eye tracking sensor will be mounted or coupled directly to the frame. In other embodiments, the eye tracking sensor will not be integrally mounted or coupled to the frame, but may rather be attached and detached from the frame.

In the case where the eye tracking sensor is a video camera (118), this camera can look at a number of different visual elements of the eye. These elements include the relative shape and location of the pupil (150), the iris (152), and sclera (154) of the eye, along with assorted blood vessels (156), and other distinguishing marks on the sclera. In addition to these features, the motion of other eye structures, such as the eyelids, blinking rates and patterns, squinting, etc. may also be monitored.

Devices Employing a Real or Virtual Touch Sensor

As can be appreciated, when a real touch sensor (170) is mounted on the frame, and the user is attempting to operate the real touch sensor in a preferably inconspicuous manner, the user will not be able to control the position of their finger (172) on the real touch sensor at all well. There will be a lot of jitter in the touch data. The invention is based, in part, on the insight that the same algorithms used to handle noisy and imprecise eye tracking data can also be used, with only minor modifications, to handle such imprecise touch input data as well.

It should be evident, however, that the interface of the present invention will work with many types of eye tracking and touch sensor devices. Thus these specific examples have been given for illustration purposes only, and are not intended to be limiting. The essential elements for the platform itself are that if eye gaze control is desired, the platform should be configured to be able to sense eye gaze angles to within at least about a +/−10-degree field of accuracy. It will often be useful if the platform also presents a real or virtual screen upon which various eye gaze targets corresponds to various eye controlled symbols or "keys", can also be implemented.

If either real or virtual touch sensor control is desired, the platform should be configured to sense the location of the finger over at least one dimensions, and preferably at least two dimensions such as an X, Y plane. The resolution and size of any real touch sensor should be preferably configured so that the sensor can distinguish more than two (preferably three or more) distinct fingertip positions on a first axis, and more than three (preferably six or more) distinct fingertip positions on a second axis of the touch sensor or touch pad.

Alternatively, if virtual touch sensor control is desired, the system may instead track the position of the user's hand, fingers, or other pointing object using one or more cameras, such as FIG. 1 (138), and correlate the position of the user's finger, hands, or other pointing object, relative to a virtual touchpad, in this manner. This virtual touchpad or touch sensor control is discussed in more detail in FIG. 2C.

In some embodiments, the eyewear device may also have one or more cameras, often video cameras oriented to view the outside world (138), often from the point of view of the user. Such cameras, which may also have microphones as well, may be useful for augmented reality applications, as well as to allow the user to discretely photograph his or her surroundings in response to appropriate commands associated with the user interface symbols or targets to operate the camera. Note that here, various regulations may require that the eyewear device also have a built in speaker or may have two stereo speakers to generate an audible sound, such as the sound of a camera shutter or other warning, when camera or camera(s) (138) is used for image, video, or video/audio recording purposes.

Figure 2A:
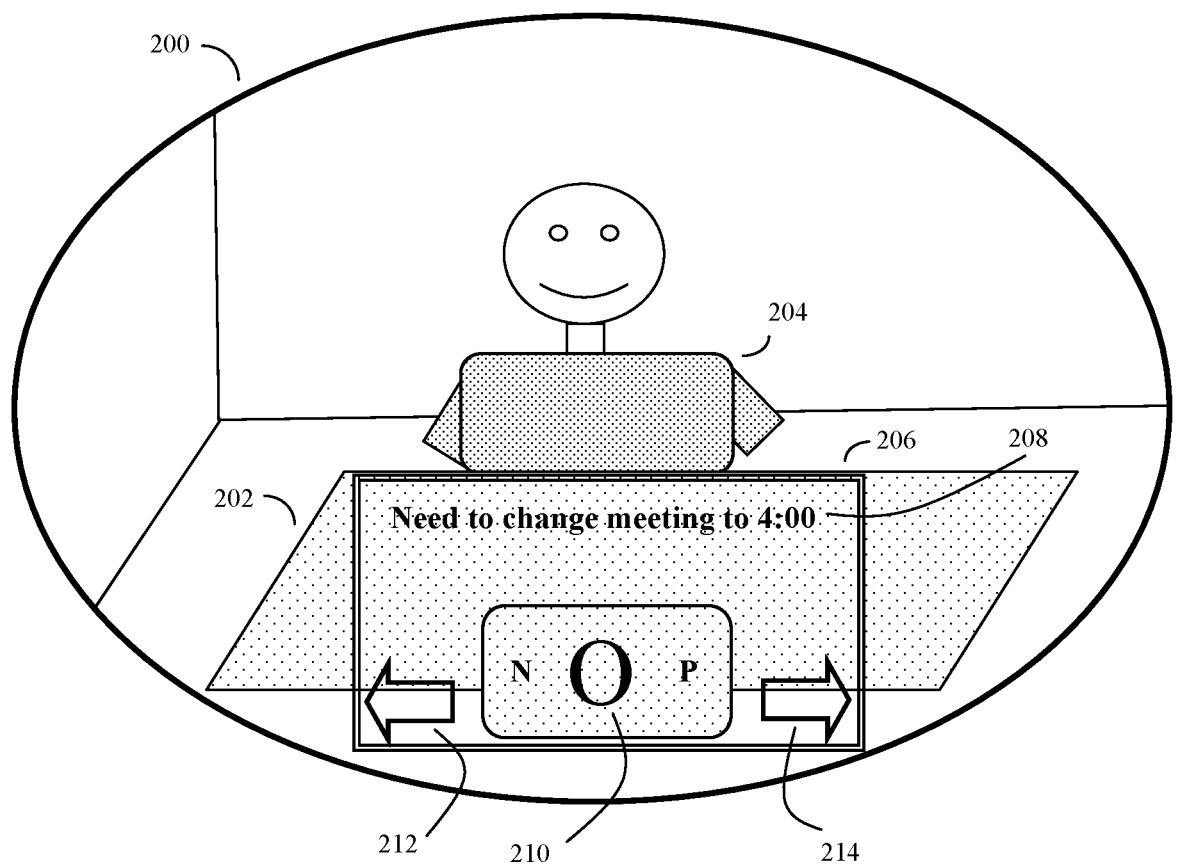
FIG. 2A shows an example of a user's view through the device of FIG. 1, showing a simplified version of the invention's user interface for communication.
Figure 2A:
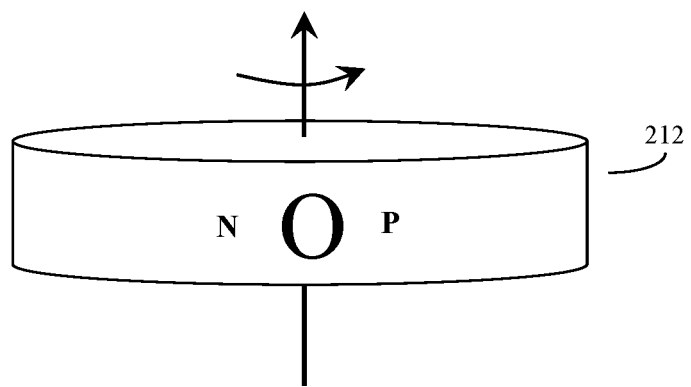

One embodiment of a suitable visual display is shown in FIG. 2A. Here the user is wearing the device shown in FIG. 1A, and the overall view (200) shows the user's view, as if peering out through glasses. The user is sitting at desk or restaurant table (202) across from another person (204), and the view of the other person and other outside world objects in the upper part of the scene is unobstructed. In the lower part of the scene, the user sees both a view of the outside world, and a view (206) of the display (112) as conveyed to the user's eye by way of correcting lens (114) and beam splitter (116) (here drawn for simplicity as a prism). As previously shown, here the beam splitter is again placed in the lower portion of the field of view, in a manner similar to a bifocal lens arrangement.

In the upper portion of the display (206), the user sees a view of an incoming message, such as a text message (208), which has been received by the device's transceiver. In the lower part of the display, the user is operating either an eye gaze or fingertip based interface to select the letter "O" to form the desired "OK" response to transmit. In this example, various symbols (letters) (210) selectable for transmission move in and out of view as if the letters were rotating on the surface of a virtual wheel (212) or other virtual solid spinning perpendicular to the user. Note that here, this "virtual wheel" is a software construct, generated by executable code, and the use of the "virtual wheel" model is intended to convey in simple terms some of the various functions that the device's display software may employ in the process of generating the visual user interface.

In addition to displaying letters, various control symbols, for example symbols for "space", "backspace", "capital letters", "send", "receive", "next message", "previous message" and the like may also be put on the surface of this virtual wheel (212) and displayed to the user.

In some embodiments, it may be useful to group the letters not in standard alphabetical order, but rather grouped according to the frequency of use, so that the most common letters in the user's language of choice are grouped together. For example, for English, the letters used in the highest frequency on average are, in order from most frequently used to least frequently used is: "E T A O I N S H R D L C U M W F G Y P B V K J X Q Z". Thus it may be useful to group the letters by the frequency of use so that the user time required to scroll to a particular letter is reduced accordingly. With use, the device might also start to learn what any given user's particular choice of letter use, word use, or other symbol use is, and adjust the position of these letters and symbols on the interface accordingly so as to improve efficiency. Likewise, it may be useful to engage word recognition software after the first letter or two is selected to predict words the user may wish to select, and display those choices on a separate virtual wheel of words. In these examples, however, the letters and numbers are grouped in their normal standard order.

In addition to letters, numbers, and control characters, simple phrases, such as "OK", "Yes", "No", "Busy", "Get back to you soon", and so on, along with various user determined pre-coded messages, may also be encoded as particular symbols, such as user-definable function keys Fn. Indeed, such phrases may be pre-encoded along with the appropriate commands to reply to an incoming message and transmit, so that a user need simply glance at the interface or use the touchpad to select a symbol for OK, and the system will know to then respond to any incoming text message with this response. The device may also be programmed append additional explanatory text, such as "sent from an eyewear device" or the manufacturer's proprietary name for the device, so that the recipient of the return message will have more context about nature of the response.

In one user interface embodiment, the user may select which letters, numbers, or control symbols to use by either gazing at or fingertip activating left rotate (212) and right rotate (214) control targets, which may control the order in which the letters are displayed by, for example, rotating the virtual wheel (212) in either direction by, for example, swiping the fingertip one way or the other, or selecting flywheels with different character sets by swiping up or down. The user can then activate the previously selected desired letters numbers, or control symbols by either gazing at or tapping a touchpad (touch sensor) when the desired letter, number, or control symbol are rotated into position for activation. Likewise, the user can subsequently choose a recipient and transmit the words, letters, symbols, etc. to that recipient by selecting and activating the appropriate targets in a similar manner.

In another embodiment, an outward-pointed camera on the device may automatically function, for example, with the GPS data on the device, and information pertaining to the purchase history of the user, to generate data used to create an augmented image representing, for example, sale items of interest in visible retail venues and map associated targets to the virtual flywheel, solid, or carousel. When rotated into position and selected by the disclosed touch or eye-gaze method, the targets or symbols may yield information, goods or services to the user specific to the venues identified by augmented reality data as disclosed by Aziz et. al., "Presentation of augmented reality images on mobile computing devices" U.S. patent application 20140002643, the entire contents of which are incorporated herein by reference. In this way, augmented reality or virtual reality data becomes more actionable, selectable and easily transmitted to contacts elsewhere.

Many other alternative embodiments are possible. In one alternative embodiment, the virtual wheel, solid, flywheel, or carousel (212) may be used to determine the order in which letters, symbols and control elements or symbols are displayed. For example, the symbols and control elements may be arranged on a virtual sphere, and the user can rotate this sphere around more than one axis by appropriate eye gaze or fingertip touch sensor commands. In another alternative environment, more than one type of virtual wheel (212) may be used, for example one for the alphabet, one for word prediction, one for numbers, one for control commands, one to phone or text frequent contacts, to further enhance the speed and flexibility of the interface.

Here some of these alternative user interface embodiments will be discussed in more detail.

In this discussion, the various regions of the display that can be activated when a user eye gaze exceeds a preset limit of time, or by fingertip commands (e.g. a "press") on a touch sensor, are referred to as "keys". Although it should be understood that these "keys" are in fact simply controlled by sensor determination of eye angles or fingertip touch on a touch sensor in relationship to a virtual target projected by an eyeglasses mounted display, for simplicity, often it is useful to use the term "keys" because this term rapidly conveys the concept of the actions that may follow once the user's eye activates a target of interest by gazing at the appropriate visual target for a predetermined length of time, or when the user's finger touches or presses on an appropriate place on a touch sensor. In one embodiment, keys may be activated by tapping, after that target is brought into the key region (e.g. selected) by first swiping the fingertip on a touchpad to rotate the virtual surface.

In this discussion, in the touch-controlled embodiment, the physical surface of the touchpad can be used by the system to track fingertip movements either independently of the virtual surface of the display, or the touch sensor/touchpad can be programmed to mirror key regions on the display. The eyeglasses are assumed to cover a 45-degree wide angle from side to side, and a 30-degree angle from top to bottom. It should be understood, however, that these particular values are simply for purposes of conveying a specific example of the invention's user interface.

Figure 2B:
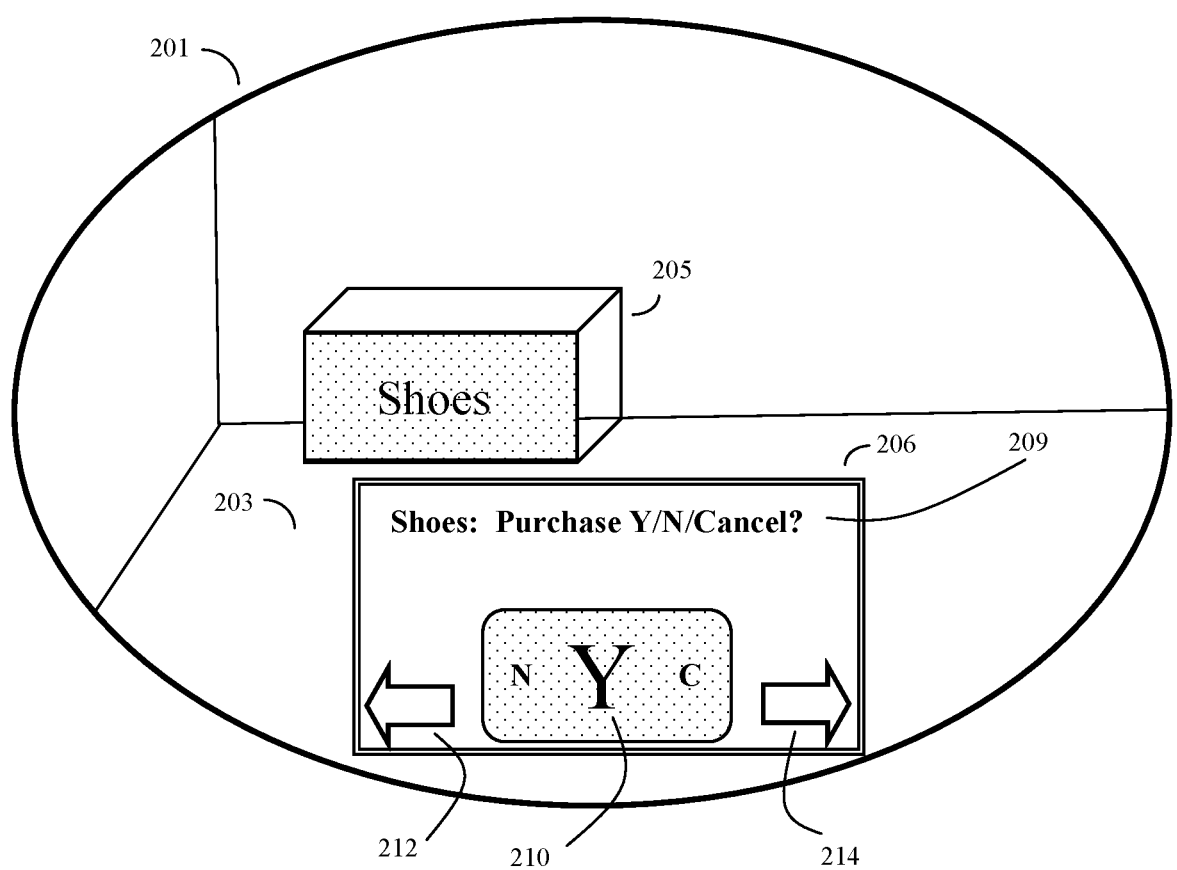
FIG. 2B shows an example of a user's view through the device of FIG. 1, showing a simplified version of the invention's user interface for an augmented reality application. Here the augmented reality "shoes" target has called up purchase specific prompts (here a N/Y/C prompt) on the rotating carousel type interface.
Figure 2B:
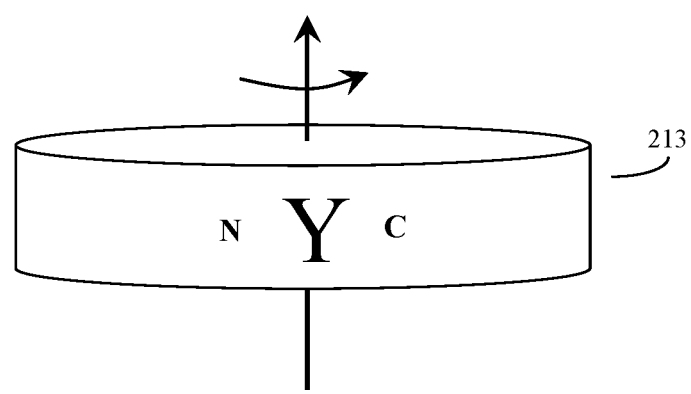

An alternate embodiment of this type of visual display, shown here being used in an augmented reality application (using camera (138) and a computer vision system 1120) is shown in FIG. 2B. Here the user is again wearing the device shown in FIG. 1A, and the overall view (201) shows the user's view, again as if peering out through glasses. The user now may be in a location where various packages (e.g. "objects") are stored, such as store or storage facility (203). There is a package (object) (205) that is being detected by camera (138) and computer vision system 1120). The camera and computer vision system recognize this package (object) (205) as a box of shoes. Here assume that the user has previously exhibited an interest in purchasing shoes, such as by using the system recently in a shoe store location or to purchase shoes online. The system can thus make an educated guess that in this context, the user might potentially be interested in purchasing this box of shoes (205).

In the lower part of the scene, the user sees both a view of the outside world, and a view (206) of the display (112) as conveyed to the user's eye by way of correcting lens (114) and beam splitter (116) (here drawn for simplicity as a prism). As previously shown, here the beam splitter is again placed in the lower portion of the field of view, in a manner similar to a bifocal lens arrangement.

In the upper portion of the display (206), the user sees a view of the system's augmented reality assessment of the situation (208). This takes the form of an identification of object (205), together with a brief message (208) that gives the user various options of interacting with object (205). Here, for example, the message is: Shoes: Purchase N/Y/Cancel? The system has also automatically presented an appropriate solid surface (rotating wheel, carousel) (213) with various possible selections (e.g. targets) relevant to the object (205), such to purchase or not, or to cancel this operation.

Note the difference between this N/Y/Cancel options shown in FIG. 2B (213), which are more appropriate for a purchasing environment, versus the more alphabetical message oriented options (N O P) (212) previously shown in FIG. 2A in the context of a messaging application. In general, the system can be configured to automatically show different targets or prompts in different contexts. In FIG. 2B, the augmented reality "shoes" target has caused the system to automatically assume that the user may wish to interact with a purchasing series of targets. Thus here, the system, once the "shoes" were recognized as being a purchasing type object, has in turn automatically populated the rotating carousel interface (213) with various purchase specific prompts or targets, rather than alphabetically arranged targets (212). These augmented reality situation specific targets such as (213) can, of course, be more complex than mere letters, and can be complete words, images, strange characters, or any other type of visual pattern as well.

Continuing with this example, in the lower part of the display, the user is operating either an eye gaze or fingertip based interface (perhaps on a real touchpad 170) to select the letter "Y" to form the desired "Yes" response to transmit indicating that the user does indeed want to purchase these shoes. In this example, as before, various symbols (letters) (210) selectable for transmission move in and out of view as if the letters were rotating on the surface of a virtual wheel (213) or other virtual solid spinning perpendicular to the user.

As previously discussed, in addition to eye gaze control, and real (e.g. physical) touchpad or touch sensor control, in some embodiments the system may also be configured to operate on a virtual touchpad or touch sensor basis. This type of embodiment is shown in more detail in FIG. 2C.

Figure 2C:
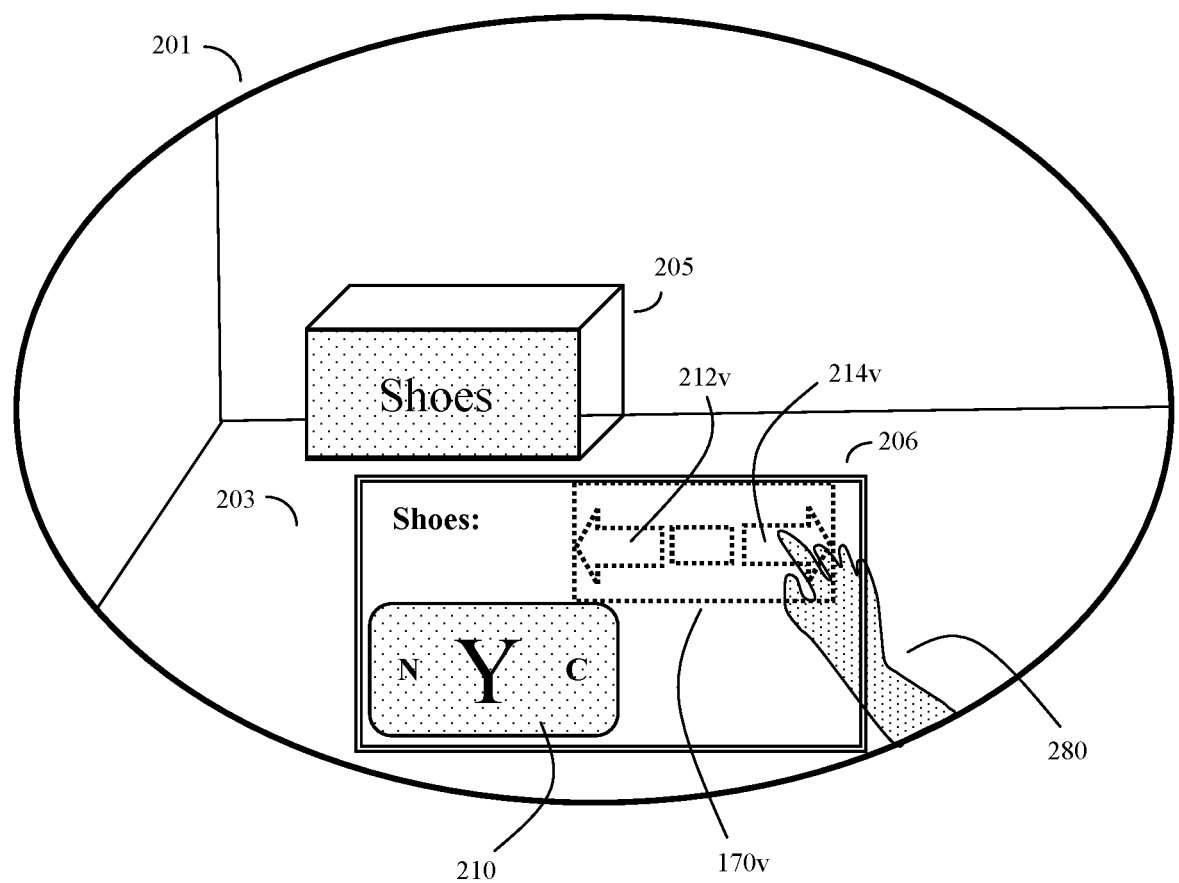
FIG. 2C shows an example of a user's view through the device of FIG. 1, showing the user interacting with a virtual touchpad, here by a finger swipe in air where the position of the user's finger, relative to the virtual touchpad, is determined by one or more device cameras.
Figure 2C:
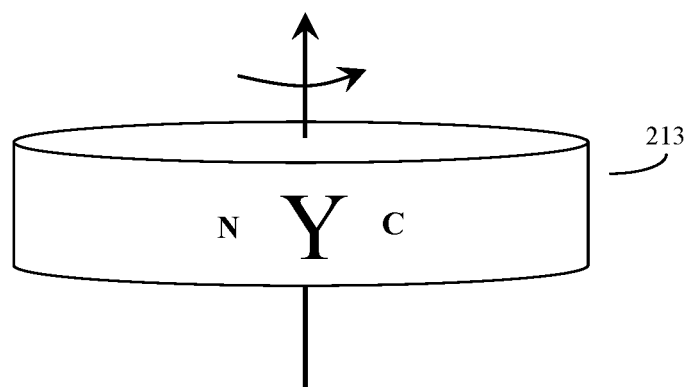

FIG. 2C shows an example of a user's view through the device of FIG. 1, showing the user interacting with a virtual touchpad (170v), here by a finger swipe in air where the position of the user's finger (280), relative to various portions of the virtual touchpad (170v), such as (214v), is determined by one or more device cameras (138). Here in some embodiments, two or more device cameras may be useful in order to use parallax effects to determine more precisely the position of the user's finger, hand, or other pointing object in space.

Put alternatively, in this type of virtual touchpad or touch sensor embodiment, the touchpad can be a virtual touchpad (170v) that is displayed by the device's virtual display (112). Here, the device's at least one camera (138) and computer vision system (FIG. 11, 1120) can be configured to recognize when a user is touching (280) various portions (e.g. 212v, 214v) of the virtual touchpad (170v). As previously described, this can be done by using the camera(s) (138) to image the position of a user hand, fingers (280), or other user controlled pointing object in a space (203) observed by the camera(s) (138).

FIG. 3 shows an overview of the invention's eye control method. The interface generally follows the "virtual wheel" or virtual "cylinder" (or other virtual surface) software construct previously shown in FIGS. 2A and 2B, as well as in parent application Ser. No. 12/842,315, the contents of which are incorporated herein by reference.

In this scheme, the visual targets (300) may be composed of visible elements such as letters of the alphabet, numbers, punctuation symbols, system controls, and user-defined keys, which are mapped into various rows and columns on the surface of a virtual solid such as a virtual cylinder (212). A small window (314) from this virtual solid (312) is in turn shown on a corresponding window (316) on the virtual display (306) at any given time. Here the virtual display (306) corresponds to the display (206) previously shown in FIGS. 2A and 2B.

Around each visible element (302) is an eye or fingertip position zone (304) that defines the region where a user's eye or eye's or finger may gaze at or touch, and even wander a bit, during a target or symbol selection process. To inform the system that the user wishes to activate this particular target or symbol (e.g. execute a virtual keypress), various methods may be used.

For example, the system may assume that a target or symbol is activated if the user's eye generally remains within this zone for a sufficient amount of time (such as at least a hovering time interval). Alternatively, a target or symbol may be activated if the user's fingertip taps the touch sensor, thus causing the system to trigger an execution command associated with that visible element in that zone. This eye or finger position zone may roughly correspond to the angular region (in degrees) in which the eye gaze direction is located, or alternatively a range of positions on the touchpad where the target can be accurately "touched" and subsequently "activated" for a particular user on a particular device.

In some embodiments, the touchpad (touch pad) surface may not be attached directly to the device, but rather be remote from the device, and be operated more independently to control the device in a manner uncoupled from the display's virtual surface. Thus, depending upon the limitations of the particular platform upon which the method and user interface is implemented, the position of the touchpad can be optimized to control the eyewear device.

In other configurations, there may not even be a physical touchpad. Instead a virtual detached touchpad may be created by, for example, using the device's display and beam splitter to project a virtual carousel, keyboard or touchpad. This virtual carousel, keyboard or touchpad can appear in 3D space in front of the user. In this embodiment, the device may then use its outward-pointed cameras (138) to monitor the position of the user's hands, and allow the user's hand position to control the virtual carousel, touchpad or keyboard by tapping, swiping or similar gestures. To the outside observer, the user is touching or tapping empty space. However the user and the system know that the user's hands are resting in the same area of empty space where the virtual carousel, keyboard or touchpad exists, and thus can interpret the user's hand motions accordingly.

In some embodiments, the virtual solid or virtual cylinder, or other virtual surface (212) may contain only one row of virtual targets, and this type of embodiment was previously shown in FIGS. 2A and 2B (212). However in order to implement still more virtual targets or virtual keys, often it will be convenient to have an embodiment with multiple rows of virtual targets, as is shown in FIG. 3 (312).

In order to shift between rows, a defined key, such as an up-arrow key ∧ (307), may be used to move the focal point of the interface (316) to different rows of the cylinder. Thus by selecting (and optionally also activating) the up arrow key ∧, the user could transition between a display of letters (row 2) (308) and a display of numbers (row 1) (312), or a display of user-defined function keys (row 4) (320), or a display of punctuation symbols (row 3) (322). The user may rotate the virtual cylinder to the right or left by selecting (and optionally activating) appropriate left < and right > direction keys (324), (326).

Each row of the cylinder may additionally have one or more keys F(a), F(b) . . . F(n) (328) (abbreviated Fa, Fb, Fn) that remain constantly displayed on display (306) regardless of the rotation of the virtual cylinder (312). These constant Fn keys can be conveniently used to control frequently used controls, such as space, shift (capital letters to small letters), backspace, and display on/off.

To simplify the user interface, the letters may follow a standard convention, such as a presumption that the letters are always to be lower case except at the beginning of a sentence. Since the space character is generally more highly used in writing than the shift key, it may be convenient to associate the letter row Fn button with a space bar (330), and place the shift key (332) in another row.

The interface may be designed to allow the user to redefine keys according to personal tastes, of course.

Note that although, for simplicity, the virtual surface and virtual solid will often be spoken of as a virtual cylinder, which somewhat implies that different rows of symbols on the surface of the virtual cylinder may have the same number of symbols and same amount of spacing, in fact this does not have to be the case. In some embodiments, the virtual solid can be configured like a sphere or other surface of revolution with some rows having more symbols than others. Likewise there is no requirement that the solid be smooth—virtual cubes, triangles, and or irregular shapes may also be used. Indeed, there is no requirement that the virtual surface be on any virtual solid at all, and thus in some embodiments, the virtual surface may be considered to be like a sheet of paper that may be curved, or even irregularly shaped.

Figure 4:
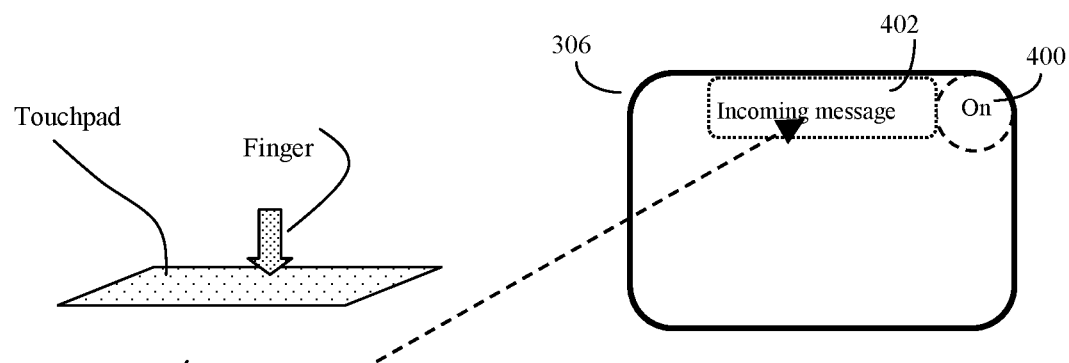
FIG. 4 shows an example of the user interface in action.
Figure 4:
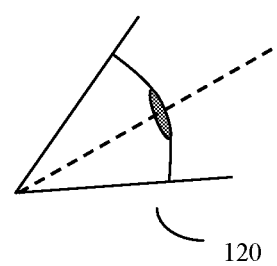
Figure 4:
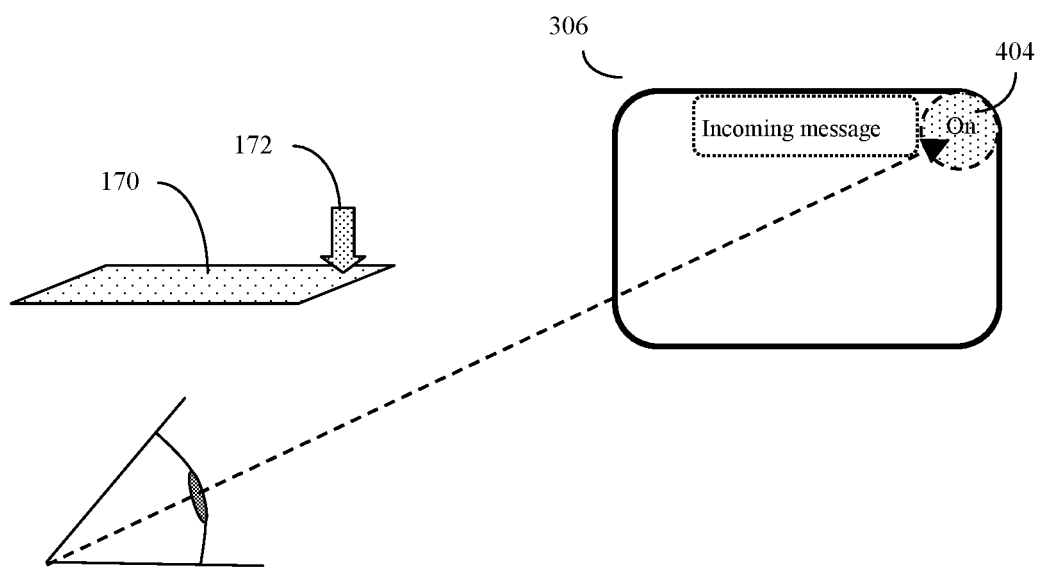

FIG. 4 shows an example of the user interface in action. Here the system, when not in use, may generally be in a "standby mode" in which at most only a small section of the display, such as an "On" key located off to one corner (400), is sensitive to user eye position. This will allow the user to move his or her eyes in a generally normal manner, regarding the outside scene, when the device is not being used to transmit data.

In FIG. 4, from standby mode, the system may receive an incoming text message (402) or other system alert, and may display this message in one part of the display. The user may decide to read this message without necessarily responding to the message. However, if the user decides to respond to the message, the user may turn the system from standby mode to a full "On" mode by gazing at the "On" key or touching the touchpad in a way associated with the "On" key (400). In FIG. 4 and subsequent figures, the touchpad or touchpad (170) and the position of the user's finger (172) on the touchpad or finger pad is also shown. See FIG. 1A or 1B for further context.

In one eye gaze interface embodiment, if the user glances at the "On" key for a first transient period of time T1, then the "On" key will not respond. If the user glances at the "On" key for a longer period T2, then the "On" key will become highlighted (404) or otherwise let the user know that the key has been selected. At this point, the user may either glance away from the key, or alternatively, if the user continues to glance at the key for a still longer period of time T3, the key will be considered to be activated or "pressed", and in this example the system will go a full active mode. This same T1, T2, T3 scheme will also be used for the other eye gaze controlled "keys" in this example. Alternatively, other sensors and other input commands, such as a user "nod" when a virtual key has been selected (detected by an accelerometer), or a user brief verbal command such as "OK" (detected by a microphone) may also be used to activate a key.

In general, although the same input device may be used for both selection and activation, there is no requirement that the same input device may be used for both selection and activation. Thus one type of input device may be used for selection, and another type of input device used for activation.

Figure 5:
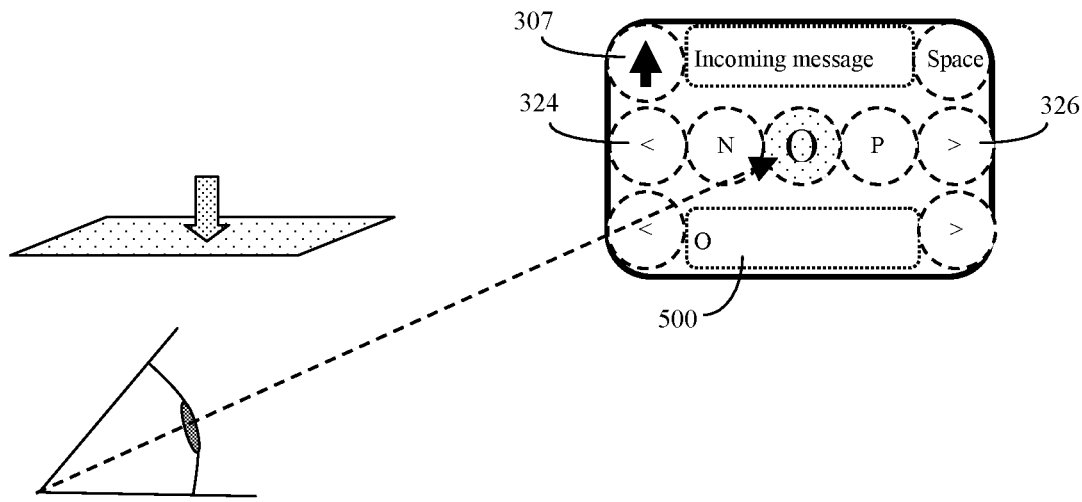
FIG. 5 shows the user interface in full active mode.
Figure 5:
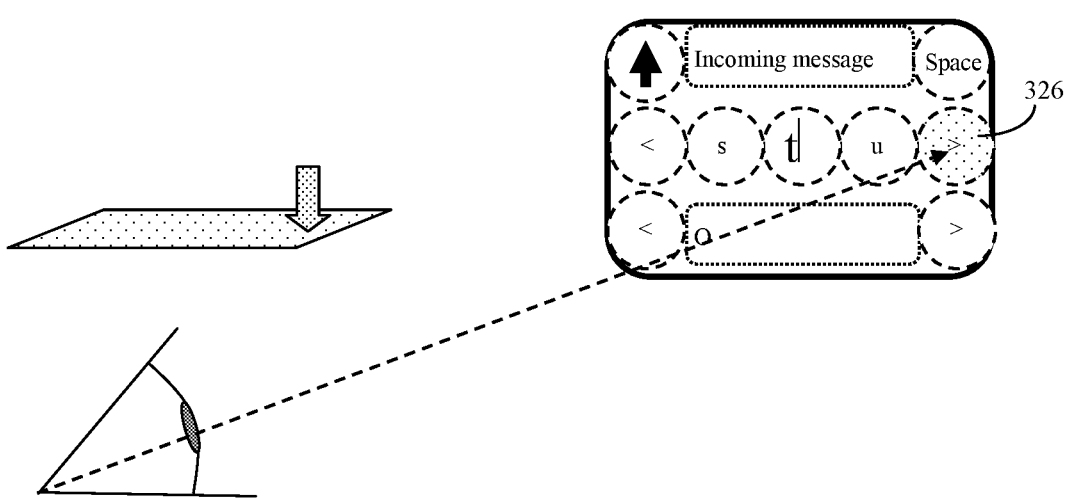

FIG. 5 shows the user interface in full active mode. In active mode, more display elements are active, and the display generally will be sensitive to a much broader range of eye gaze or fingertip commands. In FIG. 5, the user has started to send an outgoing message by first selecting the appropriate row using the up-arrow ∧ key appropriate eye gaze, or by swiping or dragging the fingertip up or down on the touchpad (307), and then selecting the appropriate column using the left < and right > keys, or again by swiping or dragging the fingertip side-to-side on the touchpad (324), (326). Here the user is in the process of activating the first letter of his response, which in this example is a capital "O" because this is the beginning of a sentence. This first letter O is shown in the outgoing message box at the bottom of the display.

Once the user has selected the first letter, the user can then select the second letter (here the next letter will be a "u") by gazing at the right > key (326) or by swiping or dragging the fingertip in the appropriate direction on the touchpad, causing the virtual cylinder to rotate so that the letter "u" is now in the center position. In FIG. 5, the virtual cylinder is still in the process of rotating, so that a non-desired letter "t" is presently in the center position. So the user must continue to rotate the cylinder by continuing to select the right > key (326).

Figure 6:
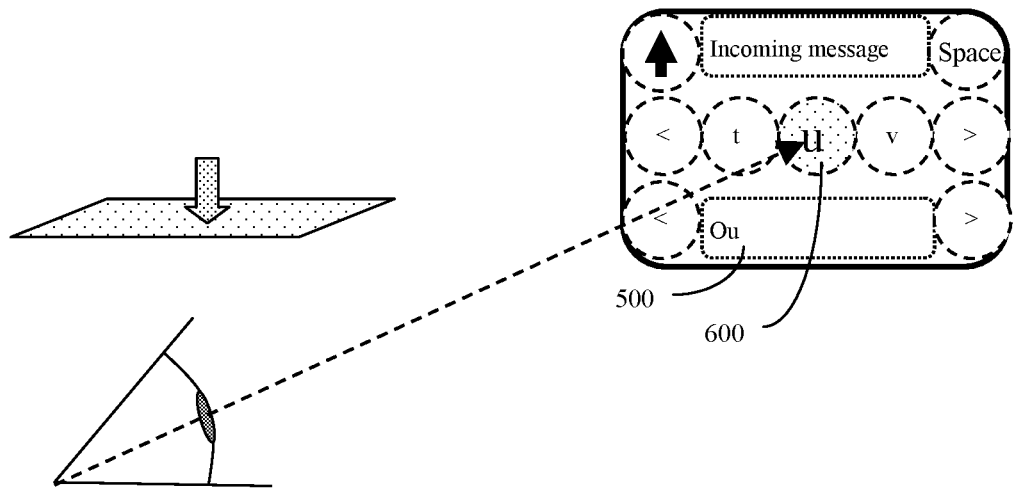
FIG. 6 shows a user generating an outgoing message.
Figure 6:
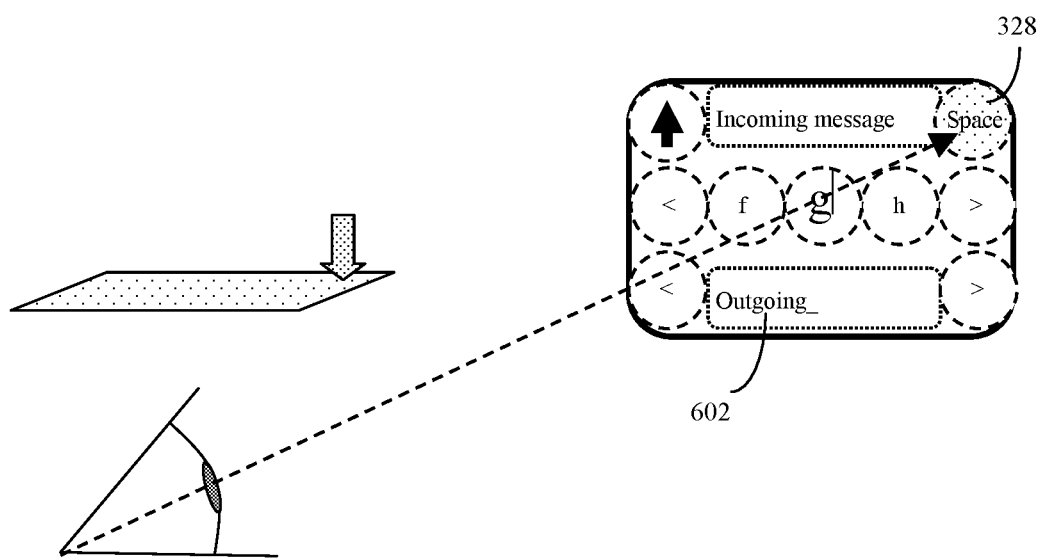

In FIG. 6, the desired letter "u" is now in the center position, and the user has just activated it by either gazing at it for a T3 length of time (600), or by tapping the touchpad. The outgoing message is starting to be constructed in the outgoing message box (500), and this can be seen as the letters "Ou".

In FIG. 6 bottom, this process has continued, and the user has just finished constructing the first word "Outgoing" (602). The user is now in the process of indicating a space by either gazing at the Fn button (328), which for this row of the virtual cylinder has been assigned to correspond to a spacebar key, or else appropriately tapping the touchpad as indicated.

Figure 7:
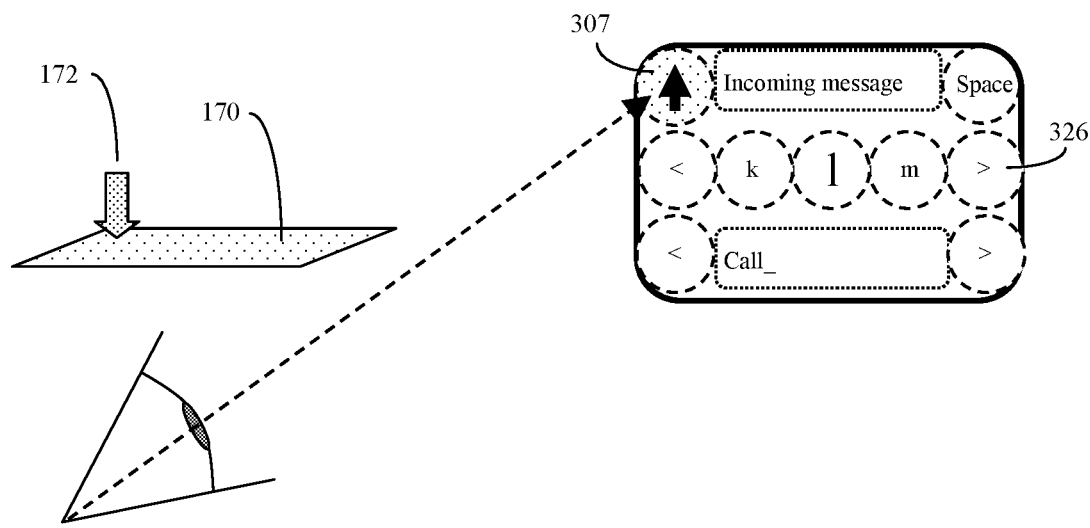
FIG. 7 shows a user generating a different outgoing message involving numbers.
Figure 7:
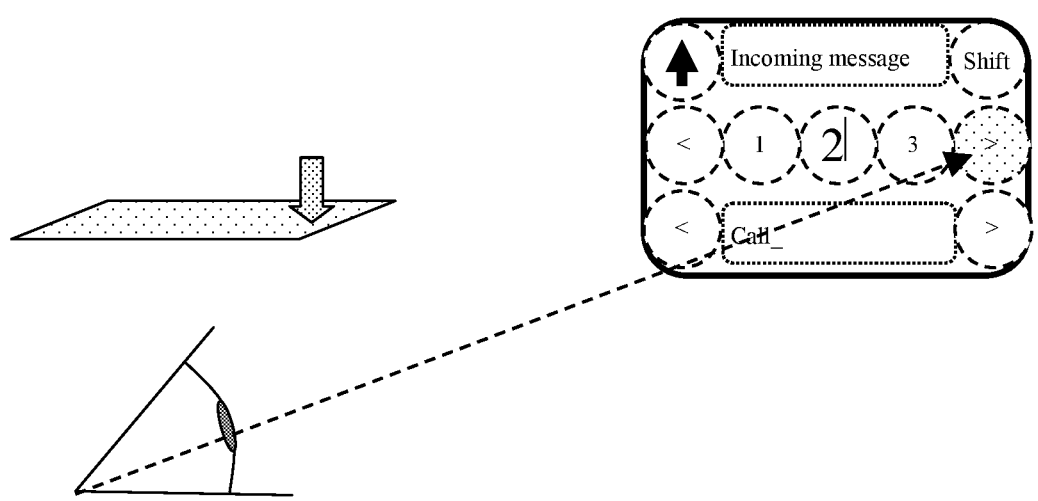

In FIG. 7, the user is now trying to send a different message, which is for a co-worker to call a certain phone number. Here the user has finished constructing the first word of the message, which is "Call", and now the user wishes to start entering numbers, which are located on a different virtual row of the virtual cylinder. Here the user can tell the system to shift to a different virtual row by gazing at the up arrow button ∧ (307) for a T3 length of time or again wiping or dragging the fingertip (172) up or down on the touchpad (170).

In FIG. 7 bottom, the user has successfully transitioned to the number virtual row of the virtual cylinder (310), and is now moving the virtual cylinder to find the desired first digit of the phone number by either gazing at the right > (326) key or again swiping or dragging the fingertip laterally along the touchpad. Again the user will enter in data by a process where keys are first selected, and then activated.

Figure 8:
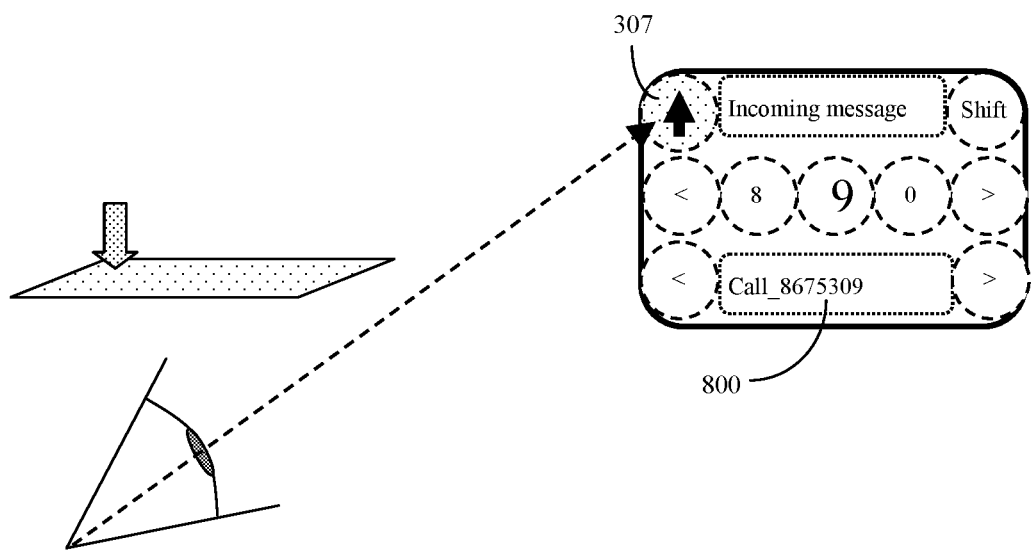
FIG. 8 shows a user now generating punctuation symbol for an outgoing message.
Figure 8:
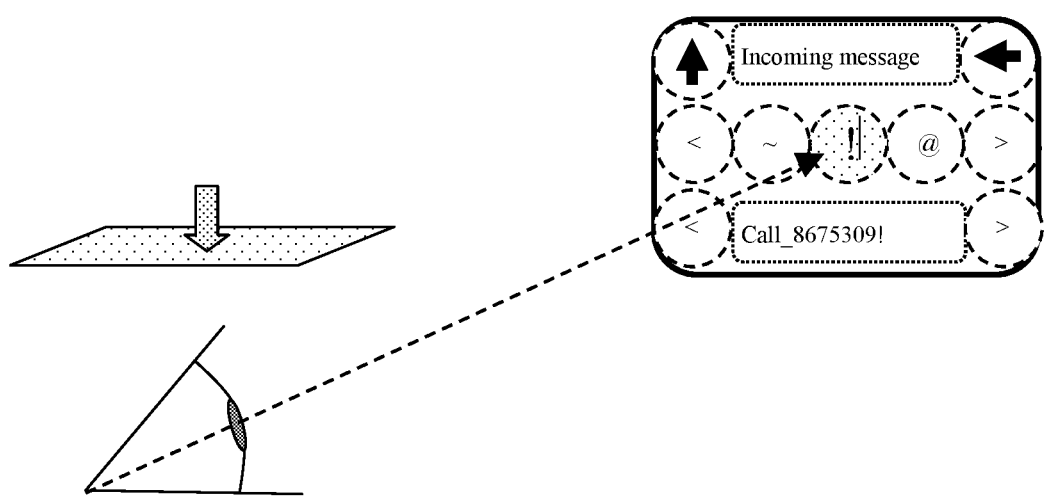

In FIG. 8 top, the user has finished constructing the phone number, and now wishes to indicate to the co-worker that the message is urgent by appending a "!" to the end of the message. Punctuation may be on yet another virtual row of the virtual cylinder, so here the user may shift to the punctuation virtual row by again either or swiping down, i.e., dragging the finger down on the touchpad, thereby moving the virtual cylinder downward to bring the above row into place for target selection In FIG. 8 bottom, the user has now moved to the punctuation virtual row (322), and has activated the desired "!" symbol by either gazing at it for a T3 period of time, or bringing it into the appropriate position and tapping on the touchpad, or using another activation sensor input, and now the outgoing message, "Call 8675309!" is complete (800).

Figure 9:
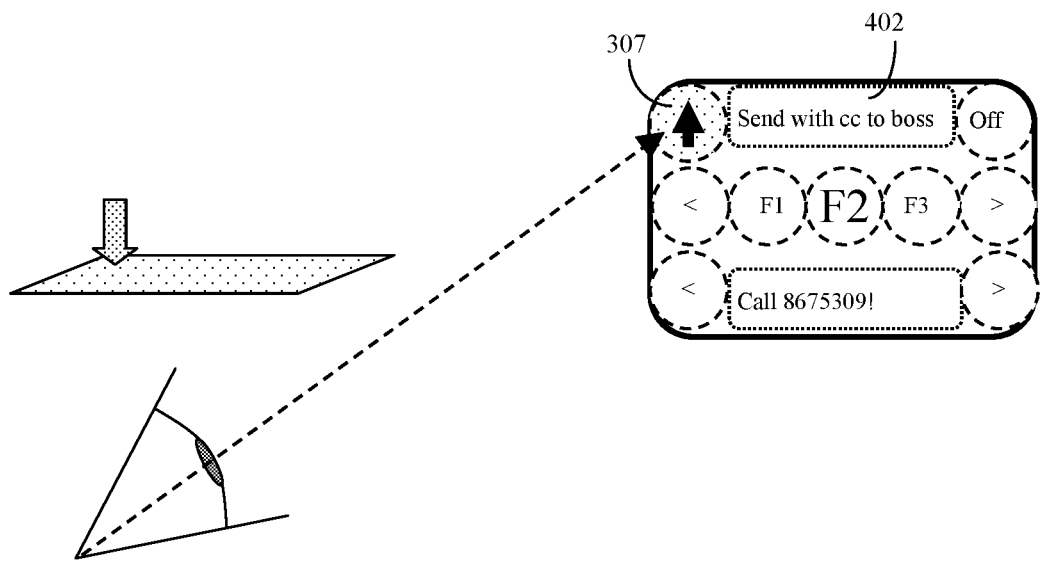
FIG. 9 shows a user using special purpose function keys.
Figure 9:
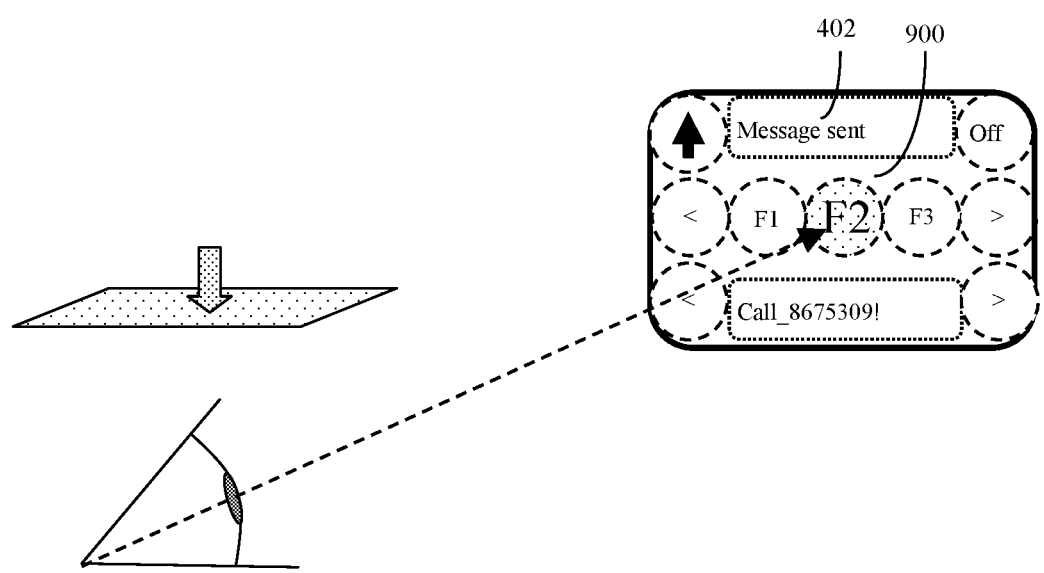

In FIG. 9, the user wishes to send the response back to the originator of the last text message to him, but also wishes to also send a copy to his boss. In this example, the user may have predefined a user key, such as F2, to be: "Send response back to last text message, cc boss's cell phone number". To achieve this goal, the user again either gazes at the up arrow key ∧ (307) or alternatively swipes or drags the fingertip down on the touchpad to select and then activate the user-defined function row. Here the user-defined function row may be an intelligent row (320) of function keys that might select the most commonly used user-defined option automatically.

The user can then easily send the text message back to the originator of the earlier text message, with a cc to his boss, by selecting and activating, for example, the previously user-defined F2 key (900). The system can in turn both remind the user of the function of the F2 key, as well as confirm when the message has been properly transmitted, by sending appropriate messages to the incoming message box (402).

Figure 10:
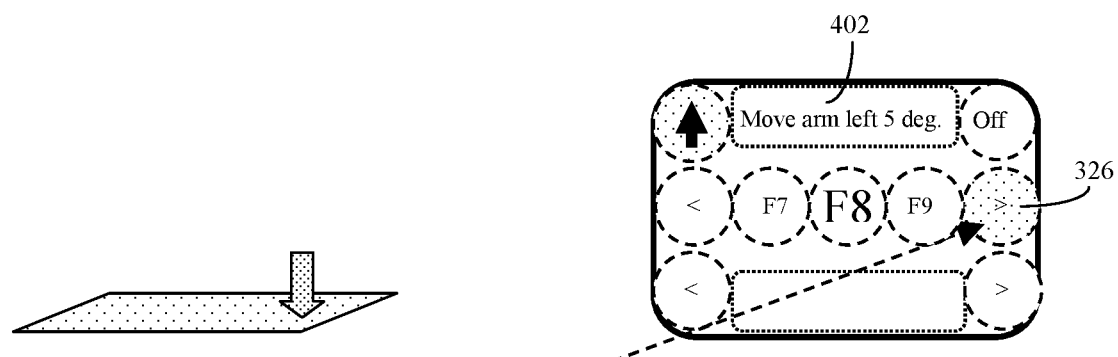
FIG. 10 shows a user either the eye gaze or touchpad interface to control a device.
Figure 10:
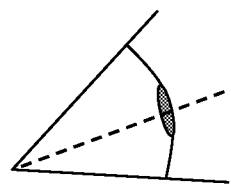
Figure 10:
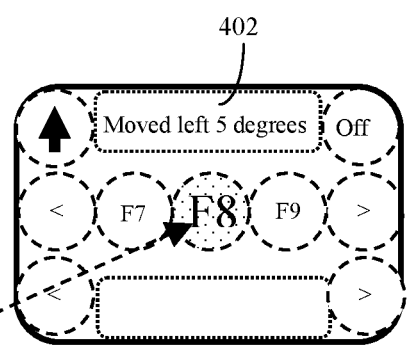
Figure 10:
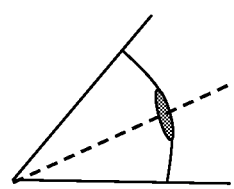

In FIG. 10, the user may want to control a function that is entirely unrelated to text messaging. For example, the user may be a disabled person desiring to operate an advanced powered wheelchair accessory, such as a robotic arm, in order to pick up a nearby object. Here, the user may have, for example, previously defined the user definable F8 key to be a key that moves the robotic arm five degrees to the left.

In FIG. 10 top, the user again gazes at the right key > (328) or alternatively swipe right or left by dragging the fingertip laterally upon the touchpad to select the appropriate user-defined function key, and the system reminds the user about the function of this key in the upper message box. Here, for example, the system is reminding the user that the F8 key was previously assigned the function to "Move arm left 5 deg." The user can then activate this key when appropriate.

In FIG. 10 bottom, the user has then moved the robotic arm left by selecting and activating the F8 key, and the system has confirmed that the "Move arm left" command was sent by displaying a "Moved left 5 degrees" message in the upper message box (402).

FIG. 11 shows an example of the electrical and optical circuitry that may be used to implement either the eye gaze version or the touch sensor version of the invention's user interface method. Often the user interface and method will be implemented in the form of software designed to run on one or more processors (1100), which may be microprocessors, possibly assisted, supplemented, or supplanted by one or more digital signal processors (DSP). The processor(s) in turn executes code or software, such as general control software (1102) and at least one of eye gaze tracking or touchpad interpretation software (1104) intended to analyze input data of either the eye returned from the eye position sensors (118) or the finger input on the touch sensor (170), and determine from this data information pertaining to the user's selection and activation intentions, which may be conveyed by various eye movements, or by tapping, double- or triple-tapping, scrolling, swiping, performing these actions with more than one finger, pinching fingers together or expanding the fingers apart, or using part of the hand or an instrument other than fingers on the touch sensor (170).

Although some embodiments of the invention may use only the eye gaze input for selection and activation, or only the touch sensor input for selection and activation, in some embodiments, the device may have both eye gaze and touch sensor input, and allow either of the two or both to be used for control purposes. Here there are some advantages to using both, because touch sensing may be used when a high degree of control is desired, and eye gaze sensing may be used when the user wishes to operate the device more inconspicuously, for example. Alternatively if the device is to be used by handicapped individuals, dual controls may enable a caretaker to quickly configure the device using the touch sensor, and then the handicapped individual can then use the eye gaze commands after initial configuration.

The processor(s) (1100) may operate one or more types of device or network interfaces, including wired or wireless transceivers (1106), which in turn may be connected to an optional antenna (1108) or wire connection which may be optionally incorporated or embedded into the head-mounted frame, such as the eyeglasses frame. The processor will also send data to a display (112) for creating a real or virtual display for viewing by the user. This may be done through optical system lens components (114) and beam splitter components (116) or by other display methods as desired. The beam splitter (116) may be implemented in various ways, including a semi-reflective and partially transmissive thin tilted plate of glass or plastic, cube beam splitter, prism design, or other optical configuration. The processor may optionally control a display illumination light (1110) to improve display visibility as needed.

Thus in some embodiments, additional sensors may also be used. For example the device may use voice recognition capability, gyroscope accelerometers, retinal scanning or eye gaze sensors (118) so that other methods of controlling the device may be used in tandem with fingertip control. For eye-gaze control, for example, one of these methods may include the methods of Oyewole Oyekoya, "*Eye Tracking, A Perceptual Interface for Content Based Image Retrieval*", Ph.D. Thesis 2007, Department of Electronic & Electrical Engineering, Adastral Park Campus, University Park London. Alternative methods include the methods of Selker et. al., "*Eye-R, a glasses mountedeye motion detection interface*", Conference on Human Factors in Computing Systems, CHI '01 extended abstracts on Human factors in computing systems, pages 179-180, and other methods.

Further Discussion Regarding the Eye Gaze Embodiment of the Invention

The human eye has a number of visible sub-structures, such as the pupil, iris, and sclera, which artificial vision software can use to track the eye, and determine where the eye is pointing or gazing at any given moment of time. However, as previously discussed, using the gaze of the eye to control devices is complicated by the fact that the position of the eye is constantly shifting. The human eye does not gaze at objects of interest in a steady uniform manner, but rather scans objects of interest by a series of saccades or rapid eye movements. In this respect, the human eye acts much like a cross between a camera and a scanner, and indeed this scanning motion helps make up for the inherent deficiencies and limitations of the eye in terms of its performance as a natural camera.

In order to compensate for this constant movement, the eye tracking software and processor must take this natural constant saccade movement into account. Here other workers in the field, such as Oyekoya, have shown that when such constant movement is compensated for, eye gaze can be an effective way to understand user intentions, and in fact in some situations eye gaze can even select objects of interest faster than alternative user interfaces, such as computer mice.

Although this step is not essential, the automated interpretation of human eye gazing is facilitated if the automated interpretation system knows the location of the objects of interest or targets that the eye is likely to be gazing upon. The automated system can then use its knowledge about the location of these targets, often called salient images, to help interpret the series of eye movements as detected by the artificial vision software. Here this target information is known because the invention is displaying these targets in specific locations in the invention's display (112).

Here the eye tracking software may, in some embodiments, operate by first storing in memory the location of various visual display targets, such as symbol targets and control targets that the system is displaying on a built-in display (112), or in a remote display (e.g. on an external display device such as a monitor, laptop computer, smartphone, and the like. The software may then process eye movement data and attempt to determine which target the user's eye is gazing on by, for example making use of algorithms such as the Oyekoya eye gaze interpretation software algorithms. These algorithms include steps such as determining if the eye is revisiting on particular target regions, and determining if the user's eye has a tendency to visit the target region just prior to the main incidence of target fixation. The speed of the eye saccade may also be used to give relevant information, because saccade speeds tend to slow down right before the target image of interest is selected. Other methods include determining changes in eye pupil diameter, because pupil diameter can tend to change when the eye is gazing upon an intended target region. Dwell time on the target may also be used because this also gives important information that the eye is fixing on a particular target.

The eye tracking software will often also use various statistical methods, such as Analysis of Variance (ANOVA) to analyze the eye tracking data, as well as to calibrate itself to the individual characteristics of any given user.

Many different types of visual interfaces may be used to control the device. One example of such a visual interface is taught by the methods of Kozma et. al., "GaZIR: Gaze-based Zooming Interface for Image Retrieval", ICMI-MLMI 2009, 2-6 Nov. 2009, Cambridge, Mass., USA, or other method. The GaZIR interface utilizes a gaze based zooming interface to allow the user to progressively zoom in on targets of interest by continuing to gaze at them. Here for example, the interface controls the speed of appearance of new letters based upon information determined by the user's gaze. Other methods may also be used.

Note that as previously discussed, often the user fingertip (172) touches on the fingertip sensor (170) will also be subject a similar type of noise and imprecision. Thus at least some of these techniques may also be useful for processing the touch sensor input data as well.

Further Discussion

Expressed alternatively, the invention may be viewed as a system, device, or method of controlling a head-mountable, vision-controlled, device for at least transmitting, and often both transmitting and receiving information from a human user with at least one eye. This device will comprise a frame configured to attach to the head of a user, as well as an optional, display or remote display, or virtual display and optional connectivity to at least one touchpad.

In a preferred embodiment, the optional connectivity to at least one touchpad may be achieved by physically connecting the at least one touchpad to the frame, thereby becoming a head-mounted touchpad as is shown in FIGS. 1A and 1B (170). Alternatively, however, the touchpad(s) may not be physically attached to the frame, but instead may be separate from the frame, and use a wireless or wired connection to transmit touch data to the head-mounted device's processor.

Another embodiment of the touchpad is "virtual touchpad" comprising a virtual carousel or other virtual 2D or 3D construct displayed to the user via the head-mounted device's display (112) or other remote display, such that the targets or symbols appear on the surface of the construct, which the user can select by tapping, swiping or otherwise gesturing at the virtual construct. The device recognizes the gestures by the outward-pointed camera (138) and processes the gestures in much the same way as discussed previously for eye gaze or more standard touchpads.

The device processor (FIG. 11 1100) can be configured (usually by suitable software) to display a plurality of visual targets on the real or virtual or remote display. This plurality of visual targets each comprise a visual element area (FIG. 3 302) embedded within a visual element position zone (FIG. 3 304) with an area that is equal to or larger than the visual element. Here each visual element area and visual element position zone may map to a touch sensitive touch element on a touchpad position zone (170).

The device, system, and/or method can thus, in some embodiments, use the at least one touchpad (170) or virtual touchpad to determine when at least one user touch is on average touching an area that is within a visual element position zone (304) of at least one of the plurality of visual element areas, thereby selecting that visual element.

Activation of that visual element can occur by various methods. For example, when the user input is within the position zone for a time period exceeding a hovering time interval.

Alternatively, the user can activate (signals that the input should be accepted) by other means, such as a tap on the touch sensor, nod, or verbal command. Once the activation command has been received, the system will know that the user intends that particular key to be activated. The processor (1100) can then use the at least one touchpad (170) or virtual touchpad to register that a virtual key corresponding to said at least one of said plurality of visual targets has been pressed by said user, and use such virtual key presses to control an executable command, such as transmitting or receiving information.

Put alternatively, as previously discussed, the process of registering that a virtual key corresponding to a given visual target has been pressed (selected and activated) can be done in more than one way. For example, if the user touch remains within the visual element position zone of any given visual elements for a time period exceeding a keypress time interval, then the device processor can register that a virtual key corresponding to this particular individual element has been pressed (e.g. activated) by the user.

If the virtual device has a microphone or other type of sensor, the user may use that microphone or vibration or motion sensor or other type of sensor to also register that a given key should be accepted. The main concept is that the user's eye gaze or touch position on a touchpad first informs the head-mounted device that a particular key is of interest (e.g. selects), and the user then sends another signal to activate or "press" the key of interest.

Thus alternatively, the device can be configured so that little or no time latency is required and the touching of a virtual key automatically issues the computing command. Alternatively, the touchpad may be configured as pressure sensitive touchpad so that only touching with a certain amount of force issues the command. Alternatively, if the user subsequently uses touch methods (e.g. a fingertip touch) to tap within the visual element position zone of a given visual element, then the device will this touchpad tap to register that a virtual key corresponding to a given at visual targets has been pressed by the user. Here various multi-touch or force touch methods may also be used.

Augmented Reality Applications

To elaborate on the previously discussed augmented reality applications, as commonly defined, "augmented reality" is "a technology that superimposes a computer-generated image on a user's view of the real world, thus providing a composite view".

The user interface methods described herein can also be useful in conjunction with, and to expand upon, various augmented reality applications as well. Here, a few additional examples are provided.

As previously discussed, in some embodiments, the head mounted device may have a camera (138) oriented to view the outside world. The head mounted device may additionally be configured to transmit images from this camera (138) to one or more computer vision systems (either mounted locally in the device, local to the user—e.g. a user smartphone application, or to remote servers such as FIG. 11 1120). These computer vision systems, further optionally supplemented with various position sensing components (e.g., GPS sensors, accelerometers, etc.), can be trained to use various types of data (e.g., object appearance data, 1D and 2D barcode data, financial transaction data) may then be configured to automatically recognize and respond when the device camera (138) picks up certain objects of interest.

In some embodiments, the device will further comprise at least one camera (138) disposed to view the outside world, as well as connectivity to a computer vision system (FIG. 11, 1120). In these embodiments, the device will further operate by, for example, acquiring images from camera (138), and by using the computer vision system (1120) to recognize when this camera is viewing a predetermined visual target. The device may further process the image with relevant data pertinent to the camera view and the user, as disclosed elsewhere (e.g. Aziz et. al, U.S. patent application 20140002643, the contents of which are incorporated herein by reference). When this happens, the computer vision system will cause the head mounted device to produce a target recognition signal. The head-mounted device can then use this target recognition signal to populate the head mounted device's virtual display with at least some visual targets that the user may opt to select as disclosed herein.

Such objects can be, for example, humans (e.g. facial recognition) scenery, museum exhibits, or any real-world object that has a distinctive enough appearance that it can be picked up with good reliability by computer vision systems. Users who are interested in particular objects of interest can then query the system for more information, store images of the object for future use, transmit images of the objects to friends, order the objects (e.g. from an online store) and so on.

The objects may also be, or represent, various financial instruments such as checks, credit cards, and the like. Store products for sale may be recognized, either through recognized markers such as UPC barcodes, or by recognition of the product design itself. The user can then purchase the products, do online comparison price checking, save the objects in a wish list, transmit a description to the object to someone else for evaluation, and so on.

Example 1

The camera and computer vision recognition system pick up an image of a check or other financial instrument. The computer vision system transmits a prompt to the device that the device should pull up the user interface virtual solid, here customized with targets for various financial transactions (e.g. depositing into the user's bank account, and the like).

Example 2

The camera and computer vision recognition system pick up a retail store in the vicinity of the user, and that retail store may offer for sale a pair of shoes that the user may be interested in purchasing. For example, the shoes may appear as an augmented reality image to the user based on the user's interaction with a particular shoe type online, at home or at a different store (e.g. different GPS location or online) within a recent time window (say perhaps the last week). The user or the augmented reality application may have trained the device to scan for that type of product, whereupon the computer vision system recognizes the product of interest in the inventory of a nearby store, the system can transmit a prompt to the device that displays an appropriate image of the products with relevant data, e.g., sale price, and again can pull up the appropriate user interface targets in such a manner that the user can quickly select to access useful information such as comparative prices, inventory status, and the like.

To provide this using a rotating solid user interface, the rotating solid on the user interface may, for example, be configured as a carousel (e.g. cylinder) populated by relevant icons/targets representing contacts, inventory, On/Off, banking (to choose the purchase method/account), and so on. Selecting a target on this rotating solid type user interface (carousel) may either issue the command, or bring up another associated carousel configured so that the user can rapidly achieve their desired action.

Example 3

The user may be in a situation where he or she has to cope with an unwieldy number of items, such as packages or crates for shipment or storage. Here the head mounted device may be configured to use its camera (138) to automatically recognize barcodes on the surface of these various items. The head-mounted device can also be configured to automatically bring up an augmented reality image of the appropriate place to move the package for proper shipping or storage. The head-mounted device may also display a rotating solid (virtual carousel) of with various targets that may represent, for example, package's sender, intended recipient, item identification, item weight, other packages associated with that particular item, and so on.

The targets, when selected and activated, can yield important information that may facilitate shipping or be transmitted, along with the augmented reality image, to the sender or other interested parties.

In other embodiments, the device may contain suitable microphones (FIG. 11, 172) and speech recognition circuitry, thus bringing up a situation specific rotating user interface triggered by sound input. This sound activated mode could still be relatively inconspicuous, since often a single word such as "banking" or "purchase" may trigger the appropriate rotating user interface, which the user could then manipulate using either eye gaze direction or touch patterns as desired. Similarly, a user-generated sound, such as the word "OK" can tell the device that the user wishes to engage a particular key that had been previously been pre-selected by either the eye gaze interface or a touchpad interface.

Foveated Rendering Methods

In some embodiments, such as when the device further comprises a display, the invention's eye-gaze detecting methods may be used to help implement foveated rendering techniques, such as the techniques of Guenter et. al., U.S. Pat. No. 9,727,991, the entire contents of which are incorporated herein by reference, and other workers. In these techniques, the system's processor devotes more processing power (and thus often more pixels or more computationally intensive rendered pixels, and/or higher image resolution) to rendering images on the portion or area of the display that the user is gazing at, and less processing power on the portion or area of the display that the user is not gazing at (thus using less pixels, or less computationally intensive rendered pixels, or lower resolution on areas that the user is not gazing at). Such methods can be used either for head mountable frames with built in visual displays, or (in embodiments without visual displays) remote displays.

The invention claimed is:
1. An eye tracking method comprising:
    wearing a self-contained head-mounted eye-tracking device comprising a head-mountable frame, at least one user eye-tracking sensor positioned to track movement of one or both eyes of the user, at least one processor, and at least one wireless transceiver;
    said eye-tracking sensor comprising at least one eye-glasses-frame-front-mounted video camera configured to focus on at least one eye of said user;
    using said at least one processor to execute eye tracking executable code and control executable code; and using said eye-tracking device to transmit wireless information by tracking any of a motion, position and gaze direction of said eye of said user with said eye tracking sensor.

2. The method of claim 1, wherein said eye tracking sensor comprises at least one IR or NIR light source and said at least one video camera is further configured to detect IR or NIR light;

wherein said at least one IR or NIR light source is configured to shine IR or NIR electromagnetic radiation into at least one eye of said user.

3. The method of claim 1, wherein said head-mountable frame is further configured to hold a lens in front of an eye of a user; and said lens is any of free of optical correction characteristics, and said lens includes optical correction characteristics customized to the optical correction needs of said eye of said user and where lens is treated to protect said eye of said user from brightness, sun rays or UV rays.

4. The method of claim 3, wherein said device further comprises at least one eyeglasses mounted optical system configured to render a virtual image of a visual display viewable by a user of said device.

5. The method of claim 4, wherein said optical system comprises at least one beam splitter mounted on a lens of said eyeglasses, said at least one beam splitter configured not to obstruct at least a portion of said user's field of view, and a converging lens or converging mirror.

6. The method of claim 4, wherein said visual display is based on retinal projection into at least one user eye, projection into an eyeglass lens of said head-mounted eye-tracking device or selected from any of the following, Liquid Crystal Displays (LCD), Organic light emitting diode displays (OLED), or Electronic paper displays.

7. The method of claim 4, wherein said visual display displays at least one target for a symbol to trigger wireless transmission or execution of a programmed command when said eye of said user is, as determined by said at least one eyeglasses-frame-front-mounted video camera configured to focus on at least one eye of said user, directed toward a target.

8. The method of claim 4, wherein said at least one processor uses said eye tracking device and said gaze direction of said eye to implement foveated rendering on said visual display wherein images on a portion or area of said visual display that said user is gazing at are rendered at a higher resolution relative to a portion or area of said visual display that said user is not gazing at.

9. The method of claim 1, wherein said transceiver is selected from any of the following, Bluetooth, Zigbee, WiFi, 0G, 1G, 2G, 3G, 4G, 5G, GSM, GPRS, CDMA, EV-DO, DECT-IS136/TDMA, iDEN, GSM EDGE 2-way-wireless-messaging FM transmissions, or other wireless communications modalities that transmit signals beyond a radius of approximately 300 feet.

10. The method of claim 1, wherein said head-mounted frame has an appearance of an eyeglasses frame.

11. A self-contained head-mounted eye-tracking system, comprising:

a head-mountable frame;

at least one user eye-tracking sensor positioned to track movement of one or both eyes of the user;

said eye-tracking sensor comprising at least one eyeglasses-frame-front-mounted video camera configured to focus on at least one eye of said user;

at least one processor programmed to execute eye tracking executable code and control executable code;

at least one wireless transceiver within or positioned in close proximity to said frame, said wireless transceiver receives wireless information and transmits said wireless information; and wherein said at least one processor programmed to execute said eye tracking executable code, and said executable code causes said eye-tracking system to transmit wireless information by tracking motion, position, or gaze direction of said eye of said user with said eye tracking sensor.

12. The system of claim 11 wherein said eye tracking sensor comprises at least one IR or NIR light source and said at least one video camera is further configured to detect IR or NIR light;

wherein said at least one IR or NIR light source is configured to shine IR or NIR electromagnetic radiation into at least one eye of said user.

13. The system of claim 11, wherein said head-mountable frame is further configured to hold a lens in front of an eye of a user; and said lens is any of free of optical correction characteristics, and/or said lens includes optical correction characteristics customized to the optical correction needs of said eye of said user.

14. The system of claim 13, further comprising at least one eyeglasses mounted optical system configured to render a virtual image of a visual display viewable by a user of said system.

15. The system of claim 14, wherein said optical system comprises at least one beam splitter mounted on a lens of said eyeglasses, said at least one beam splitter configured not to obstruct at least a portion of said user's field of view, and a converging lens or converging mirror.

16. The system of claim 14, wherein said visual display is based on retinal projection into at least one user eye, projection into an eyeglass lens of said system or selected from any of the following, Liquid Crystal Displays (LCD), Organic light emitting diode displays (OLED), or Electronic paper displays.

17. The system of claim 14, wherein said visual display displays at least one target for a symbol intended to trigger wireless transmission or execution of a programmed command when said eye of said user is, as determined by said at least one eyeglasses-frame-front-mounted video camera configured to focus on at least one eye of said user, directed toward a target.

18. The system of claim 14, wherein said at least one processor is configured to use said eye tracking sensor and said gaze direction of said eye to implement foveated rendering on said visual display wherein images on a portion or area of said visual display that said user is gazing at are rendered at a higher resolution relative to a portion or area of said visual display that said user is not gazing at.

19. The system of claim 11, wherein said head-mounted frame has an appearance of an eyeglasses frame.

20. A self-contained head-mounted combination eye-tracking and display device for transmitting and receiving information, comprising:

a head-mountable frame configured to hold a lens in front of an eye of a user;

at least one user eye-tracking sensor positioned to track movement of one or both eyes of the user;

said eye-tracking sensor comprising at least one eyeglasses-frame-front-mounted video camera configured to focus on at least one eye of said user;

at least one processor programmed to execute eye tracking executable code and control executable code;

at least one optical system configured to render a virtual image of a visual display viewable by a user of said device;

at least one wireless transceiver built-in or positioned in close proximity to said frame, said wireless transceiver receives wireless information and transmits said wireless information to said optical system; and wherein said at least one processor programmed to execute said eye tracking executable code, and said executable control code causes said eye-tracking and display device to transmit wireless information by tracking a motion, position or gaze direction of said eye of said user with said eye tracking sensor, translating said motion, position or gaze of said eye of said user into any of eye-tracking data, and at least one symbol or command, and transmitting said eye-tracking data, and at least one symbol or command using said at least one wireless transceiver.

* * * * *